US012801561B2

(12) United States Patent
Doddi et al.

(10) Patent No.: US 12,801,561 B2
(45) Date of Patent: Nov. 17, 2026

(54) INTERFACING MODULES ASSOCIATED WITH DIFFERENT CONFIGURATIONS

(71) Applicant: QUALCOMM Incorporated, San Diego, CA (US)

(72) Inventors: Ravindranath Doddi, Hyderabad (IN); Ramacharan Sundararaman, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 121 days.

(21) Appl. No.: 18/823,335

(22) Filed: Sep. 3, 2024

(65) Prior Publication Data

US 2026/0064625 A1 Mar. 5, 2026

(51) Int. Cl.
*G06F 15/78* (2006.01)

(52) U.S. Cl.
CPC ...... *G06F 15/7807* (2013.01); *G06F 15/7896* (2013.01)

(58) Field of Classification Search
None
See application file for complete search history.

(56) References Cited

U.S. PATENT DOCUMENTS 11,288,222 B1 * 3/2022 Noguera Serra ... G06F 13/4027
12,001,367 B2 * 6/2024 Noguera Serra ... G06F 13/4027
12,411,788 B2 * 9/2025 Jin ...................... G06F 13/4004
12,517,853 B2 * 1/2026 Jin ...................... G06F 13/4004
2022/0327276 A1 10/2022 Seshan et al.
2022/0342841 A1 10/2022 Choudhary et al.
2024/0095206 A1 3/2024 Dakshinamurthy et al.

OTHER PUBLICATIONS

International Search Report and Written Opinion PCT/US2025/036755 ISA/EPO Sep. 29, 2025.

* cited by examiner

*Primary Examiner* — Jany Richardson
(74) *Attorney, Agent, or Firm* — Harrity & Harrity, LLP

(57) ABSTRACT

Various aspects of the present disclosure generally relate to integrated circuits. In some aspects, a device may include a plurality of modules. The device may indicate, via a module of the plurality of modules and during an initialization parameter exchange, whether the module supports a flexible module configuration that enables the module to be interfaced with another module associated with a different configuration than the module. The device may configure, via a multi-module physical logic and based on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration. Numerous other aspects are described.

18 Claims, 18 Drawing Sheets

400

100

300

400

600

| UCIe Link Capability | | |
|---|---|---|
| Bit | Attribute | Description |
| 3:1 | HWInit | Maximum link width |
| 20 | HWInit | Advanced package module width |
| 24:22 | HWInit | Act_Mod0, ActMod1, Act_Mod2 |
| 27:25 | HWInit | Act_stk_0, Act_stk_1, Act_stk_2 |

| Act_mod_2 | Act_mod_1 | Act_mod_0 | Active D2D Stack Configuration |
|---|---|---|---|
| 0 | 0 | 0 | Default – Configuration with four multi-modules |
| 0 | 0 | 0 | M0, M1 as single configuration and M2, M3 as single configuration |
| 0 | 0 | 0 | M0, M1 as single configuration and M2, M3 are independent modules |
| 0 | 0 | 0 | M1, M2 as single configuration and M0, M3 are independent modules |
| 0 | 0 | 0 | M2, M3 as single configuration and M0, M1 are independent modules |
| 0 | 0 | 0 | M0, M1, M2, M3 are independent modules |
| 0 | 0 | 0 | NA |
| 0 | 0 | 0 | NA |

| Act_stk_2 | Act_stk_1 | Act_stk_0 | Active D2D Stack Configuration |
|---|---|---|---|
| 0 | 0 | 0 | Default – One D2D stack active for M0 |
| 0 | 0 | 0 | 2 D2D stacks active for M0 and M2 |
| 0 | 0 | 0 | One D2D stack for M0, M1 is active, and two D2D stacks are active for M2, M3 |
| 0 | 0 | 0 | One D2D stack for M1, M2 is active, and two D2D stacks are active for M0, M3 |
| 0 | 0 | 0 | One D2D stack for M2, M3 is active, and two D2D stacks are active for M0, M1 |
| 0 | 0 | 0 | Four D2D stacks are active for M0, M1, M2, M3 |
| 0 | 0 | 0 | NA |
| 0 | 0 | 0 | NA |

FIG. 6

INTERFACING MODULES ASSOCIATED WITH DIFFERENT CONFIGURATIONS

FIELD OF THE DISCLOSURE

Aspects of the present disclosure generally relate to integrated circuits and, for example, to interfacing modules associated with different configurations.

BACKGROUND

A system on chip (SoC) is an integrated circuit that integrates a plurality of electronic components. The electronic components may include a processor, memory, and/or a transceiver, which may all be integrated on a single piece of silicon. The SoC may contain digital signal processing functions. The SoC may be used for a mobile computing device, such as a smart phone or a tablet computer.

SUMMARY

In some implementations, a device includes a plurality of modules, wherein a module of the plurality of modules is configured to: indicate, during an initialization parameter exchange, whether the module supports a flexible module configuration that enables the module to be interfaced with another module associated with a different configuration than the module; and multi-module physical (PHY) logic configured to: configure, based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

In some implementations, a method includes indicating, via a module of a plurality of modules in a device and during an initialization parameter exchange, whether the module supports a flexible module configuration that enables the module to be interfaced with another module associated with a different configuration than the module; and configuring, via a multi-module PHY logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

In some implementations, a non-transitory computer-readable medium storing a set of instructions includes one or more instructions that, when executed by one or more processors of a device, cause the device to: indicate, via a module of a plurality of modules in the device and during an initialization parameter exchange, whether the module supports a flexible module configuration that enables the module to be interfaced with another module associated with a different configuration than the module; and configure, via a multi-module PHY logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram of an example associated with a Universal Chiplet Interconnect Express (UCIe) link capability register, in accordance with the present disclosure.

DETAILED DESCRIPTION

Figure 1:
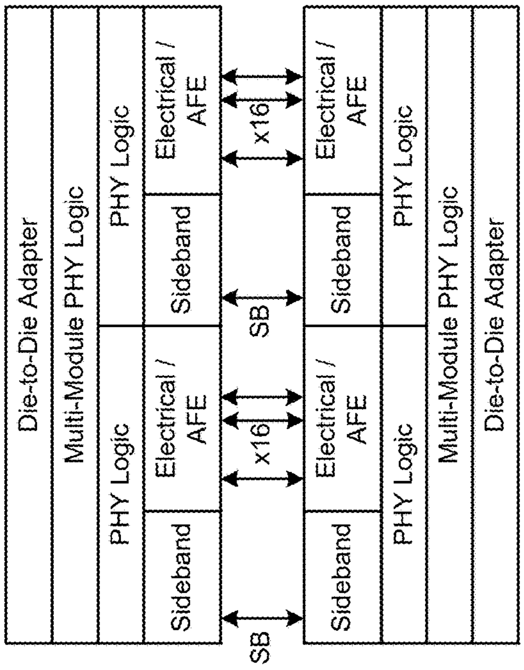
FIG. 1 is a diagram illustrating an example associated with a two-module configuration for a standard package, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A chiplet is a small integrated circuit that contains a well-defined subset of functionality. A chiplet may be designed to be combined with other chiplets on an interposer in a single package. A set of chiplets may be implemented in a mix-and-match type of assembly, which may provide several advantages over a traditional system on chip (SoC). For example, the same chiplet may be used in different devices. Chiplets may be fabricated with different processes, materials, and nodes, where each chiplet may be optimized for a particular function. Chiplets may be tested before assembly. Multiple chiplets working together in a single integrated circuit may be referred to as a multiple chip (multi-chip) module or an advanced package. Each chiplet may use a different silicon manufacturing process, suitable for a specific device type, computing performance, or power draw requirement.

Chiplets may be associated with standards, such as a Universal Chiplet Interconnect Express (UCIe) specification. The UCIe specification is an open specification for a die-to-die (D2D) interconnect and serial bus between chiplets. A common chiplet interconnect specification may allow for the intermixing of components from different silicon vendors within the same package and may improve manufacturing yields by using smaller dies. The UCIe specification may define a physical (PHY) layer, protocol stack, software model, and procedures for compliance testing. The PHY layer may support up to 32 gigatransfers per second (GT/s) with 16 to 64 lanes. The PHY layer may use a 256 byte flow control unit for data. The UCIe specification may define various on-die interconnect technologies.

A UCIe main data path on physical bumps may be organized as a group of lanes, which may be referred to as a module. The module may form an atomic granularity for a structural design implementation of a UCIe analog front end (AFE). A number of lanes per module for a standard package and an advanced package may be defined. For example, the standard package (standard module) may have 16 lanes. The advanced package (advanced module) may have 64 lanes (x64). A sideband lane may be common for the module. The sideband lane may support two transmit-receive (Tx-Rx) pairs for data transmission. The 16 lanes or 64 lanes may be associated with a mainband. Thus, a PHY link of a UCIe may be composed of the sideband and the mainband, where the sideband may be a connection that is used for parameter exchanges and register accesses, and the mainband may be a connection that constitutes a main data path of UCIe.

A multi-module configuration, such as a four-module configuration for an advanced package, may be a static configuration. The multi-module configuration may not support an aggregation or bifurcation of modules based at least in part on the static configuration. The multi-module configuration, which may have two or four modules, may need to be configured with another multi-module configuration having only two or four modules, in accordance with the static configuration. For example, two chiplets cannot be interfaced with each other unless both chiplets support the same configuration, which may limit a design flexibility. The static configuration may facilitate an case of implementation, but the static configuration may place a limitation on system design, thereby requiring customized design solutions. Due to the static configuration, a chiplet with a multi-module configuration supporting four modules or two modules may only be interfaced with another multi-module with four modules or two modules, respectively, thereby limiting the design flexibility and degrading an overall system performance.

Various aspects relate generally to integrated circuits. Some aspects more specifically relate to interfacing modules associated with different configurations. In some examples, a device, such as an SoC device, may include a plurality of modules and multi-module PHY logic. A module of the plurality of modules may indicate, during an initialization parameter exchange, whether the module supports a flexible module configuration that enables the module to be interfaced with another module associated with a different configuration than the module. The multi-module PHY logic may configure, based at least in part on the initialization parameter exchange, an interfacing between a first set of modules, of the plurality of modules, and a second set of modules, of the plurality of modules. The multi-module PHY logic may configure the interfacing based at least in part on a first configuration associated with the first set of modules and a second configuration associated with the second set of modules that is different from the first configuration. The multi-module PHY logic may configure the interfacing based at least in part on an update to a register associated with a link capability. The update to the register may configure one or more multi-module PHY logic stacks and/or one or more D2D stacks, which may serve to enable the interfacing. The register may include a first set of bits to indicate an active module configuration and a second set of bits to indicate an active D2D stack configuration. The register may be updated to include information regarding a number of active modules and associated configurations, a number of D2D stacks to be active to drive subsequent links that are formed, and/or one or more modules for which the multi-module PHY logic is to be fully or partially bypassed.

Particular aspects of the subject matter described in this disclosure can be implemented to realize one or more of the following potential advantages. In some examples, by configuring the interfacing based at least in part on the update to the register, the described techniques can be used to support an interfacing of asymmetric multi-module configurations. The interfacing of asymmetric multi-module configurations may provide an aggregation or bifurcation feature, in which each module may be configured independently according to system need, which may improve a system design flexibility. Further, the interfacing of asymmetric multi-module configurations may help with scaling, as different modules having different configurations may be added or replaced depending on system need. As a result, an overall system performance may be improved.

FIG. 1 is a diagram illustrating an example 100 associated with a two-module configuration for a standard package, in accordance with the present disclosure.

As shown in FIG. 1, a two-module configuration for a standard package may include a D2D adapter and multiple module (multi-module) PHY logic. The two-module configuration may include a first module and a second module. The first module may be associated with PHY logic, a sideband, and an electrical or AFE (mainband), where the mainband may be associated with 16 lanes. The second module may be associated with PHY logic, a sideband, and an electrical or AFE (mainband), where the mainband may be associated with 16 lanes. The mainband may also be associated with lanes for a forward clock (FWD-CLK) and a valid track, respectively.

As indicated above, FIG. 1 is provided as an example. Other examples may differ from what is described with regard to FIG. 1.

Figure 2:
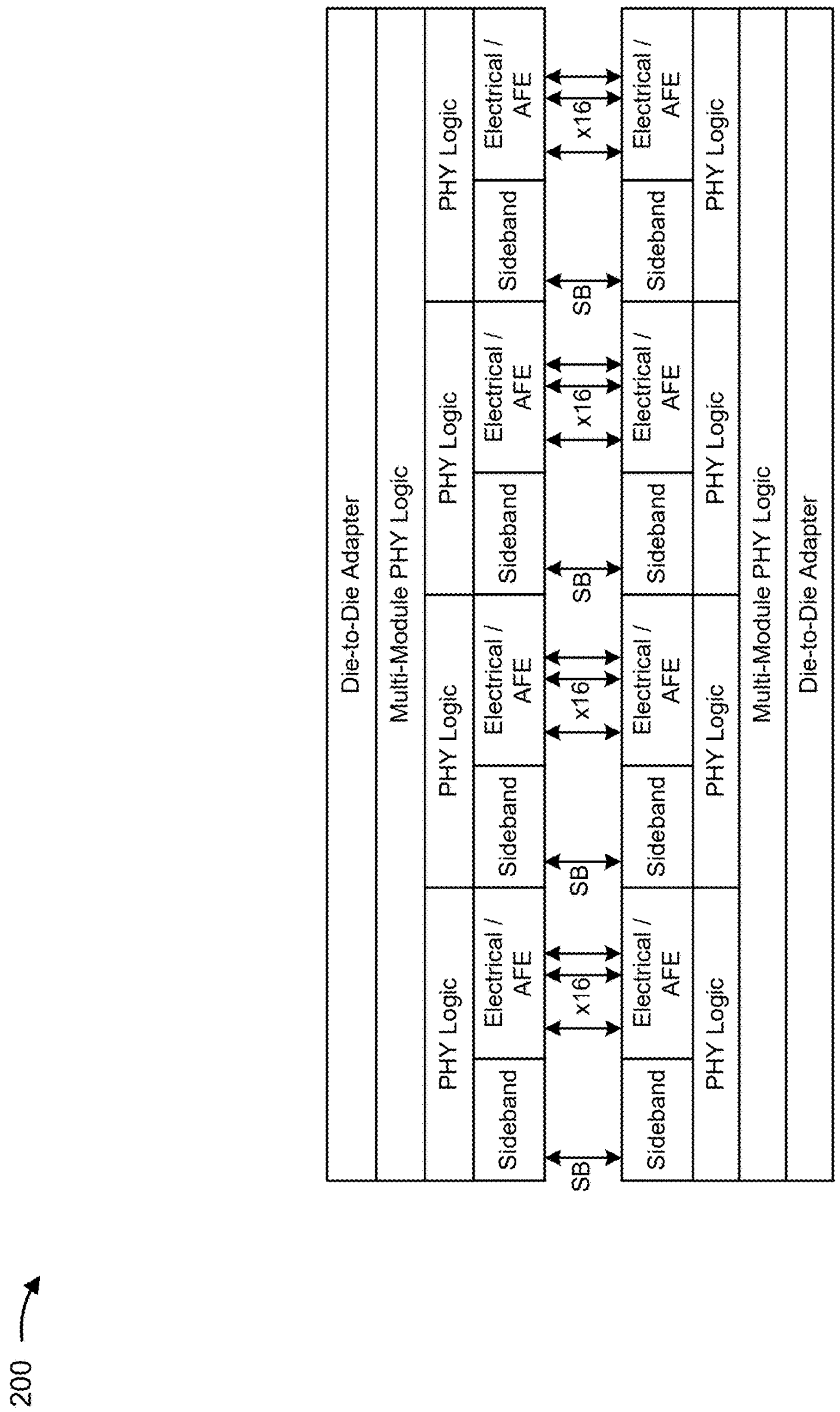
FIG. 2 is a diagram illustrating an example associated with a four-module configuration for a standard package, in accordance with the present disclosure.

FIG. 2 is a diagram illustrating an example 200 associated with a four-module configuration for a standard package, in accordance with the present disclosure.

As shown in FIG. 2, a four-module configuration for a standard package may include a D2D adapter and a multi-module PHY logic (MMPL). The four-module configuration may include four modules. Each module may be associated with PHY logic, a sideband, and an electrical or AFE (mainband), where the mainband may be associated with 16 lanes.

As indicated above, FIG. 2 is provided as an example. Other examples may differ from what is described with regard to FIG. 2.

Figure 3:
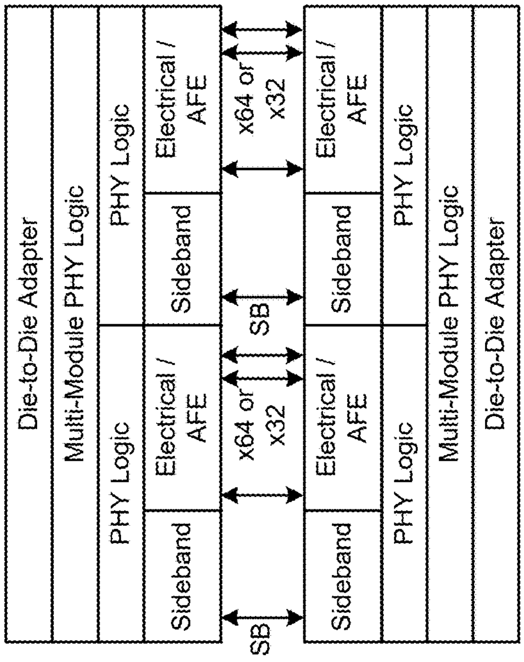
FIG. 3 is a diagram of an example associated with a two-module configuration for an advanced package, in accordance with the present disclosure.

FIG. 3 is a diagram of an example 300 associated with a two-module configuration for an advanced package, in accordance with the present disclosure.

As shown in FIG. 3, a two-module configuration for an advanced package may include a D2D adapter and an MMPL. The two-module configuration may include a first module and a second module. The first module may be associated with PHY logic, a sideband, and an electrical or AFE (mainband), where the mainband may be associated with 64 lanes or 32 lanes. The second module may be associated with PHY logic, a sideband, and an electrical or AFE (mainband), where the mainband may be associated with 64 lanes or 32 lanes.

As indicated above, FIG. 3 is provided as an example. Other examples may differ from what is described with regard to FIG. 3.

FIGS. 4A-4D are diagrams of examples 400 associated with a supported configuration for multiple modules and non-supported configurations for multiple modules, in accordance with the present disclosure.

As shown in FIGS. 4A-4D, an advanced package multi-module implementation may include four modules, such as a first module, a second module, a third module, and a fourth module. A four-module link may be associated with the four modules. The four modules may be associated with common MMPL and a common D2D adapter. Each module may be associated with PHY logic, a sideband, and an electrical or AFE. The sideband may be associated with two Tx-Rx pairs for data transmission. The electrical or AFE may be associated with 64 lanes (x64). The 64 lanes may be associated with a mainband. The four-module link may support 256 lanes (e.g., 64 lanes for each module link).

Figure 4A:
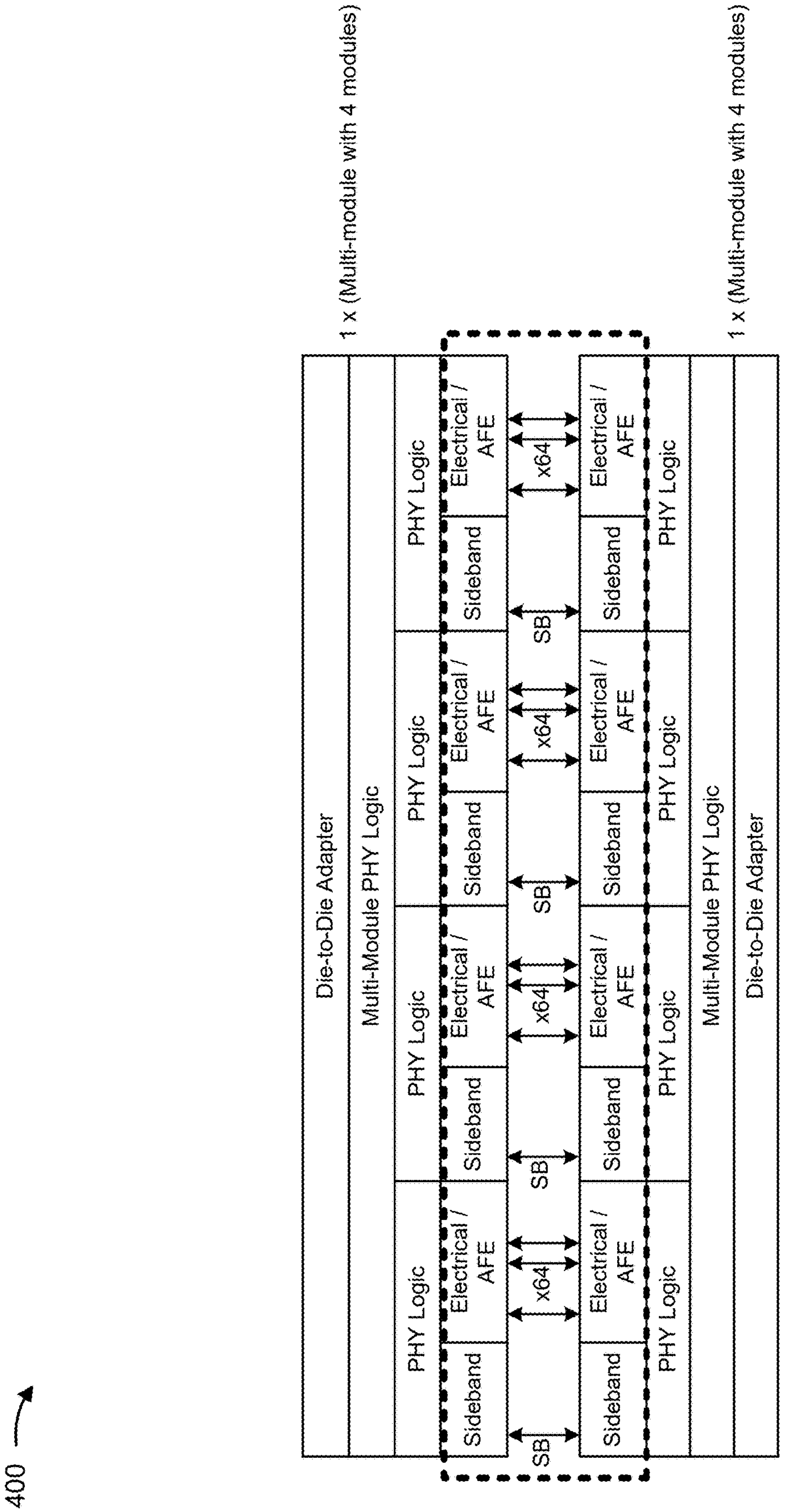
FIGS. 4A-4D are diagrams of examples associated with a supported configuration for multiple modules and non-supported configurations for multiple modules, in accordance with the present disclosure.

As shown in FIG. 4A, a first multi-module configuration with four modules may be interfaced with a second multi-module configuration with four modules. Such a configuration may be supported because both multi-module configurations are associated with the same number of modules.

Figure 4B:
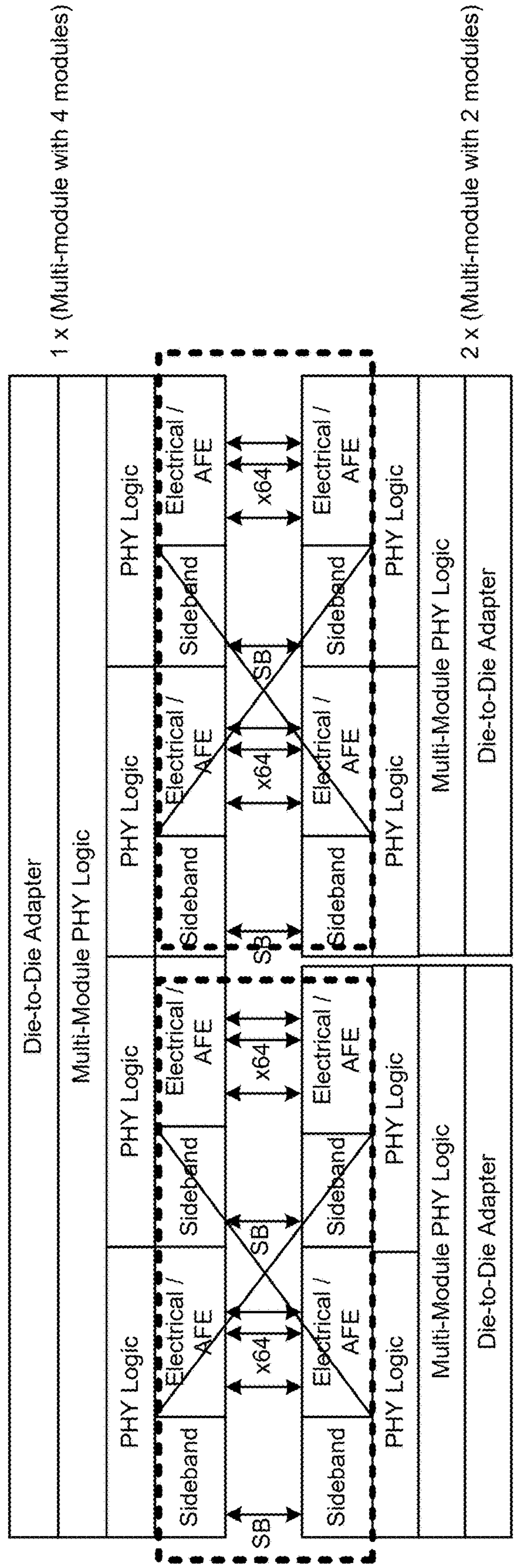

As shown in FIG. 4B, a multi-module configuration with four modules may be unable to be interfaced with a first multi-module configuration with two modules and a second multi-module configuration with two modules. Such a configuration may not be supported because different types of multi-module configurations cannot be interfaced with each other.

Figure 4C:
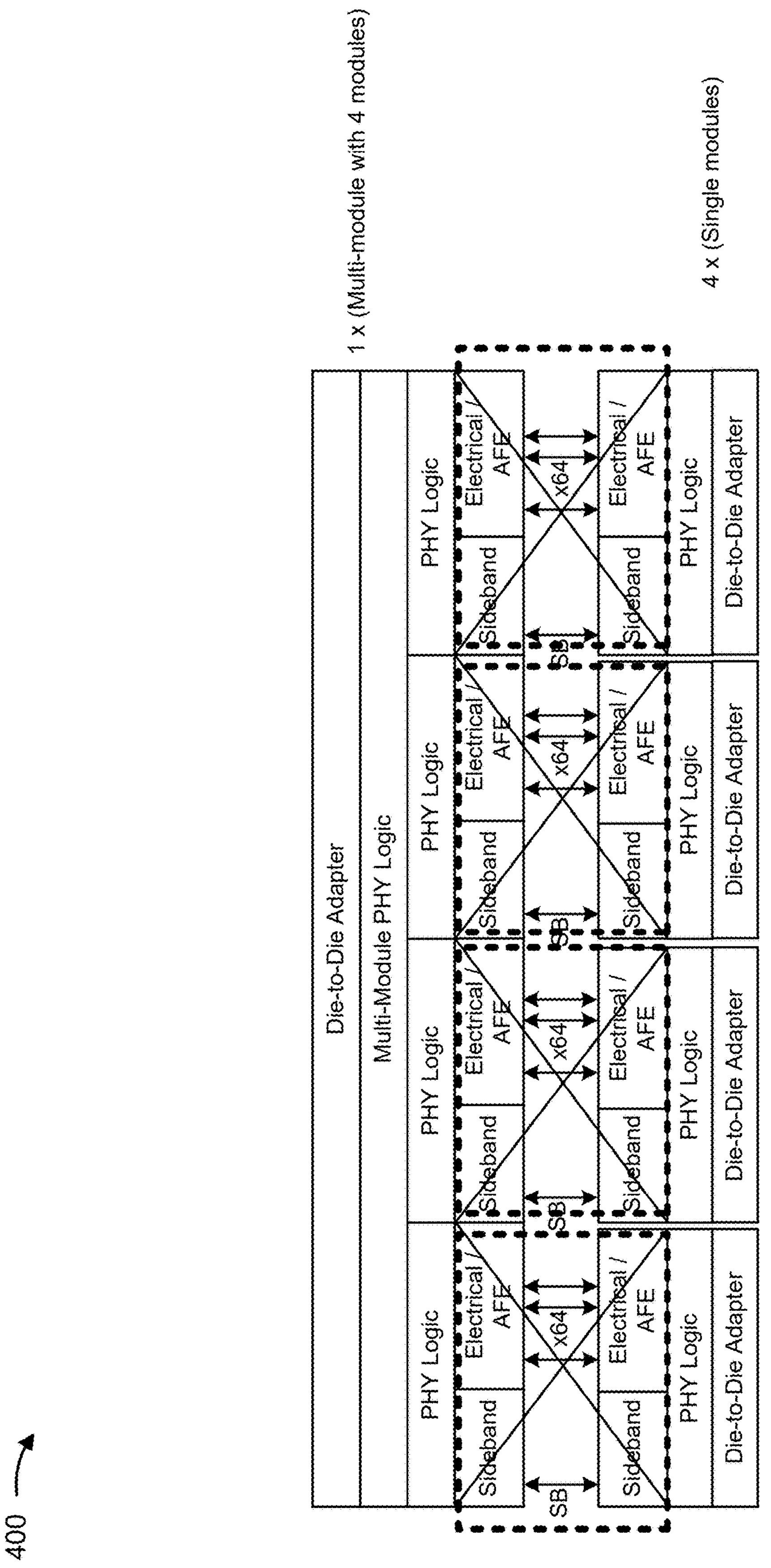

As shown in FIG. 4C, a multi-module configuration with four modules may be unable to be interfaced with a first single-module configuration, a second single-module configuration, a third single-module configuration, and a fourth single-module configuration. In other words, the multi-module configuration with four modules may not be interfaced with four independent single modules. Such a configuration may not be supported because different types of multi-module configurations cannot be interfaced with each other.

Figure 4D:
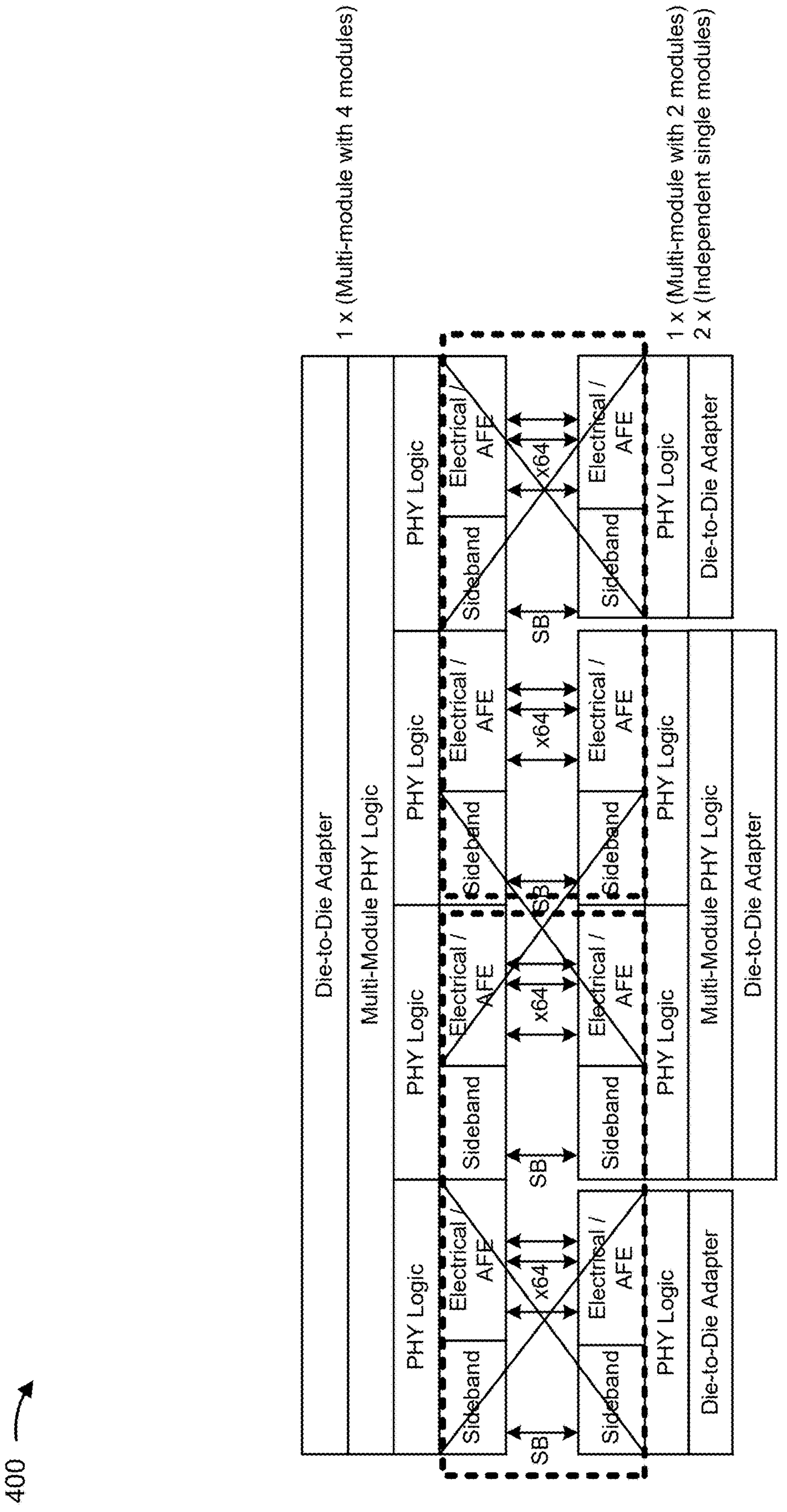

As shown in FIG. 4D, a multi-module configuration with four modules may be unable to be interfaced with a multi-module configuration with two modules, a first single-module configuration, and a second single-module configuration. In other words, the multi-module configuration with four modules may not be interfaced with one multi-module configuration with two modules and two independent single modules. Such a configuration may not be supported because different types of multi-module configurations cannot be interfaced with each other.

A multi-module configuration, such as a four-module configuration for an advanced package, may be a static configuration. The multi-module configuration may not support an aggregation or bifurcation of modules based at least in part on the static configuration. The multi-module configuration, which may have two or four modules, may need to be configured with another multi-module configuration having only two or four modules, in accordance with the static configuration. For example, two chiplets cannot be interfaced with each other unless both chiplets support the same configuration, which may limit a design flexibility. The static configuration may facilitate an case of implementation, but such a rule places a limitation on system design, thereby requiring customized design solutions. Due to the static configuration, a chiplet with a multi-module configuration supporting four modules or two modules may only be interfaced with another multi-module with four modules or two modules, respectively, thereby limiting the design flexibility and degrading an overall system performance. In these examples, the multi-module configuration may only allow multi-modules having the same capabilities to be interfaced with each other. The configuration may not allow multi-modules having different capabilities to be interfaced with each other, which may add to design limitations due to heterogeneous configurations being required to be interfaced with each other. Such design limitations may degrade the overall system performance.

As indicated above, FIGS. 4A-4D are provided as examples. Other examples may differ from what is described with regard to FIGS. 4A-4D.

In various aspects of techniques and apparatuses described herein, a device, such as an SoC device, may include a plurality of modules and multi-module PHY logic. A module of the plurality of modules may indicate, during an initialization parameter exchange, whether the module supports a flexible module configuration that enables the module to be interfaced with another module associated with a different configuration than the module. The multi-module PHY logic may configure, based at least in part on the initialization parameter exchange, an interfacing between a first set of modules, of the plurality of modules, and a second set of modules, of the plurality of modules. The multi-module PHY logic may configure the interfacing based at least in part on a first configuration associated with the first set of modules and a second configuration associated with the second set of modules that is different from the first configuration. The multi-module PHY logic may configure the interfacing based at least in part on an update to a register associated with a link capability. The update to the register may configure one or more multi-module PHY logic stacks and/or one or more D2D stacks, which may serve to enable the interfacing. The register may include a first set of bits to indicate an active module configuration and a second set of bits to indicate an active D2D stack configuration. The register may be updated to include information regarding a number of active modules and associated configurations, a number of D2D stacks to be active to drive subsequent links that are formed, and/or one or more modules for which the multi-module PHY logic is to be fully or partially bypassed. By configuring the interfacing based at least in part on the update to the register, an interfacing of asymmetric multi-module configurations may be supported, which may improve an overall system performance.

Figure 5:
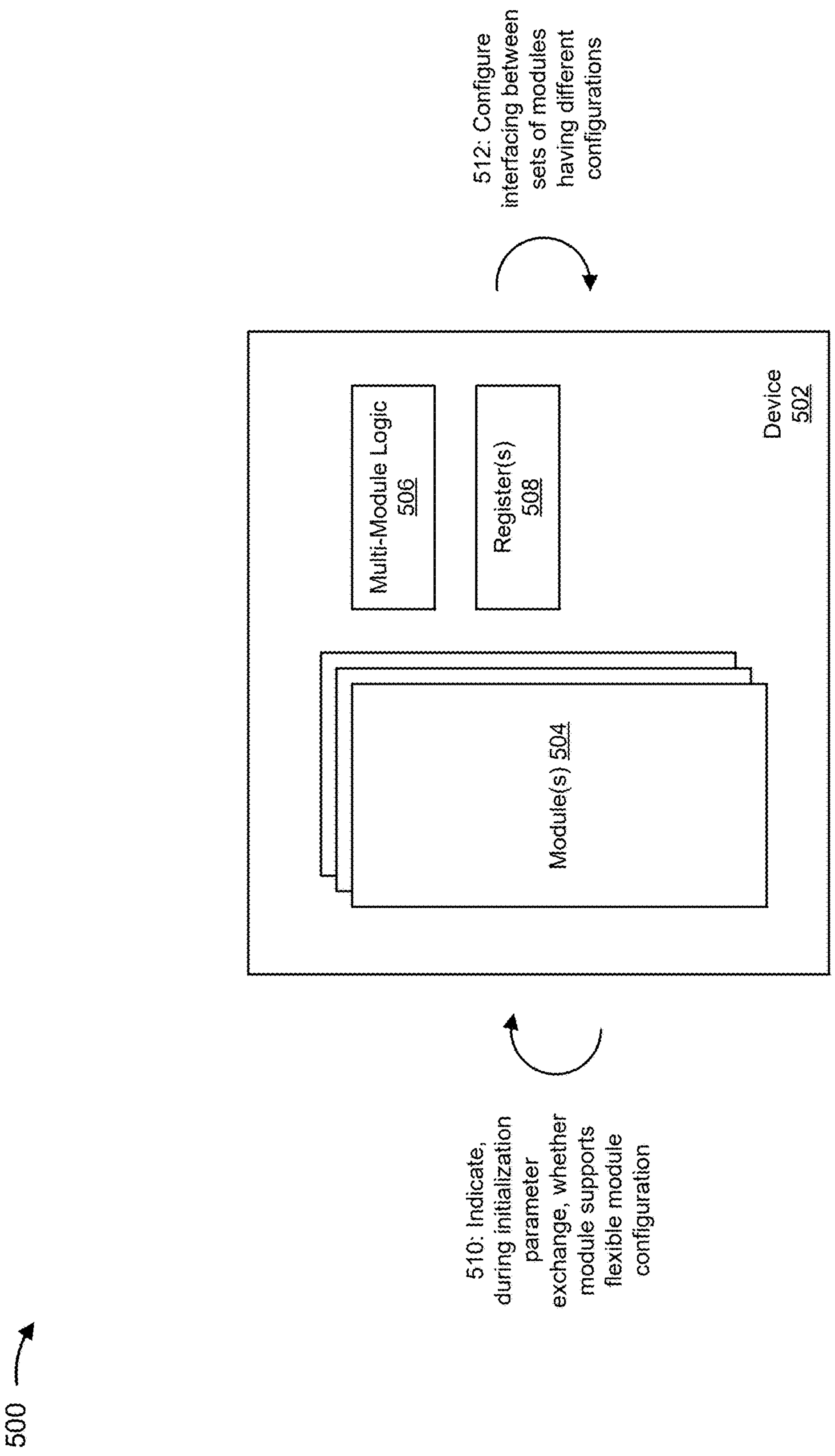
FIG. 5 is a diagram of an example associated with interfacing modules associated with different configurations, in accordance with the present disclosure.

FIG. 5 is a diagram of an example 500 associated with interfacing modules associated with different configurations, in accordance with the present disclosure.

As shown in FIG. 5, a device 502, such as an SoC, may be associated with an advanced package multi-module implementation. The device 502 may include a plurality of modules 504. The plurality of modules 504 may be in accordance with a UCIe specification. The device 502 may include a multi-module PHY logic 506 (e.g., MMPL), and one or more registers 508, such as a first register and a second register.

As shown by reference number 510, a module 504, of the plurality of modules 504, may indicate, during an initialization parameter exchange, whether the module 504 supports a flexible module configuration that enables the module 504 to be interfaced with another module associated with a different configuration than the module 504. In some aspects, when the flexible module configuration is supported by the module 504, the module 504 may further indicate, during the initialization parameter exchange, whether the module 504 is associated with a single module configuration, or whether the module 504 is associated with a multi-module configuration. When the module 504 is associated with the multi-module configuration, the module 504 may indicate a number of modules in the multi-module configuration. In some aspects, the multi-module PHY logic 506 may configure the first register to indicate a first bit and a second bit, where the first bit may be set to indicate whether the flexible module configuration is supported, and the second bit may be set to indicate whether the flexible module configuration is enabled when the flexible module configuration is supported.

In some aspects, as part of the initialization parameter exchange, the plurality of modules 504 may perform a handshake procedure via sideband messages. During the initialization parameter exchange, the plurality of modules 504 may indicate whether a flexible module configuration is supported. The flexible module configuration, when supported and enabled, may allow for modules of different configurations to be interfaced with each other. Whether the flexible module configuration is supported and/or enabled may be based at least in part on contents of the first register (e.g., a flexible module configuration register). The first register may include the first bit (e.g., a flexible module configuration support bit) to indicate whether the flexible module configuration is supported). The first register may include the second bit (e.g., a flexible module configuration enabled bit) to indicate whether the flexible module configuration is enabled).

In some aspects, during the initialization parameter exchange, the plurality of modules 504 may each exchange information on whether a supported configuration is a single module configuration, or the supported configuration is a multi-module configuration along with a number of supported modules (e.g., two or four modules). In other words, when a module 504, of the plurality of modules, supports the flexible module configuration, that module 504 may exchange additional information on whether the module 504 is a single module or part of a multi-module configuration (e.g., the module 504 is one of multiple modules associated with the multi-module configuration). When the module 504 is one module in the multi-module configuration, the module 504 may indicate a number of modules that are part of the multi-module configuration.

Figure 7A:
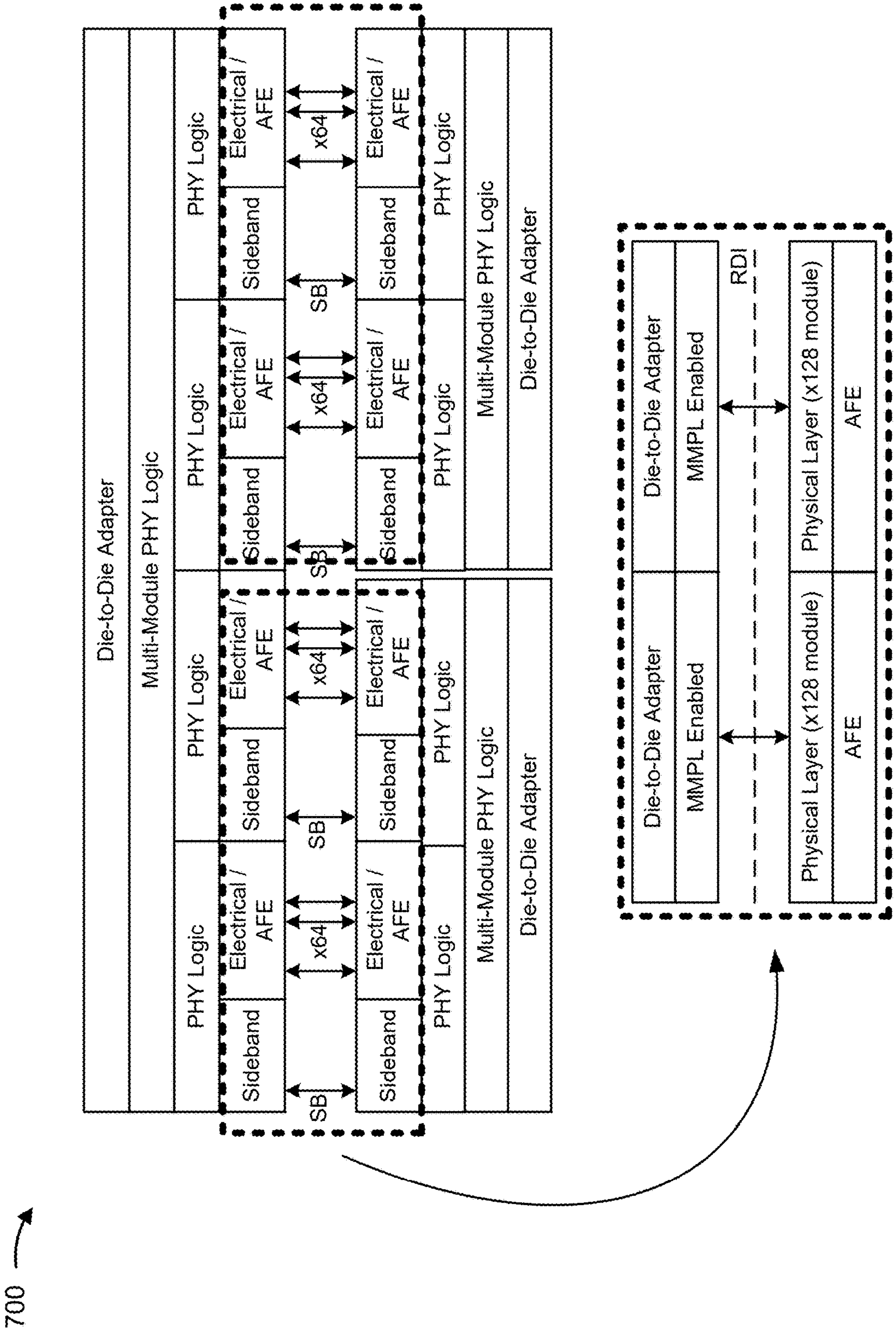
FIGS. 7A-7B are diagrams of examples associated with interfacing modules associated with different configurations, in accordance with the present disclosure.
Figure 8A:
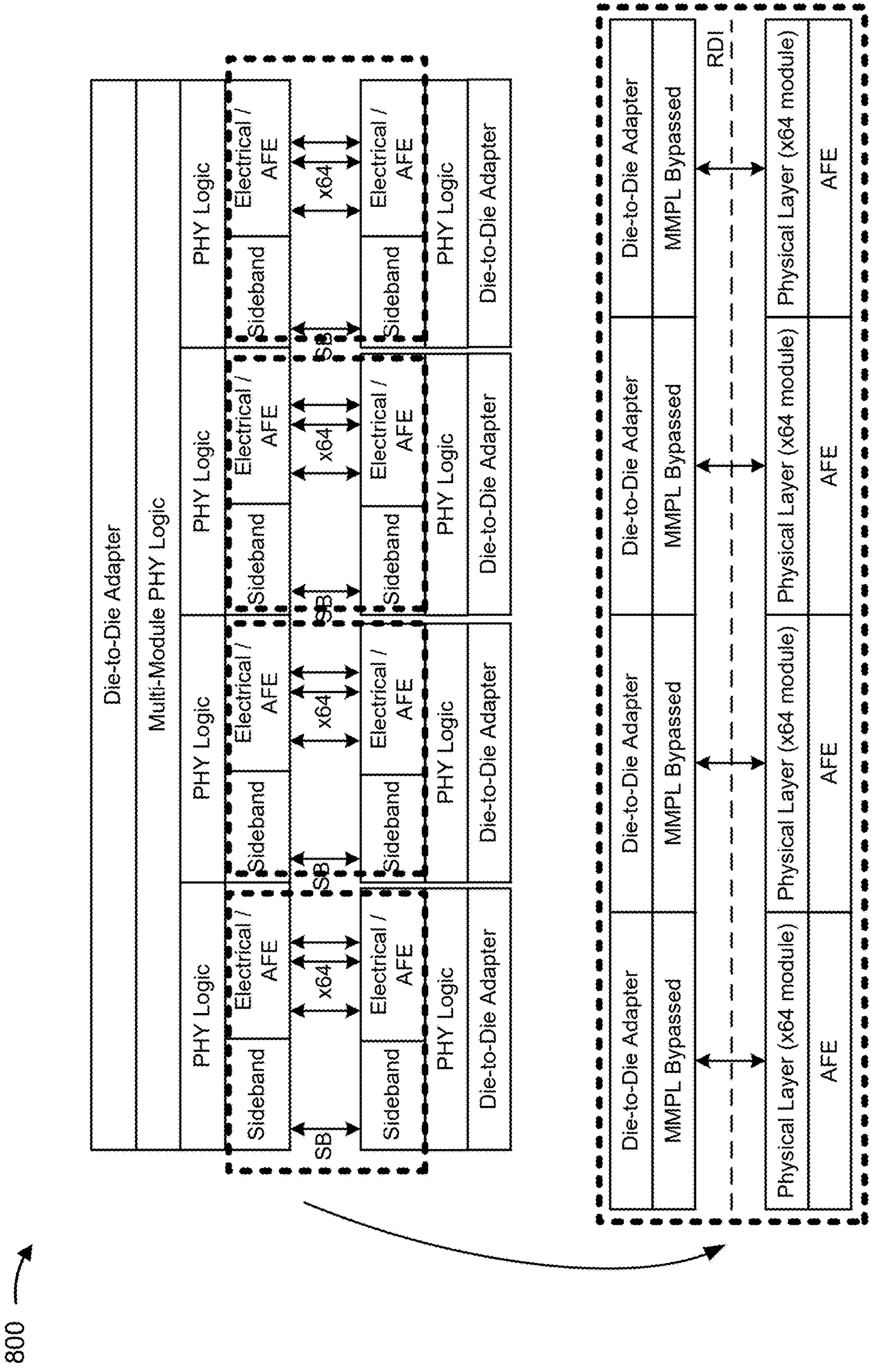
FIGS. 8A-8B are diagrams of examples associated with interfacing modules associated with different configurations, in accordance with the present disclosure.
Figure 9A:
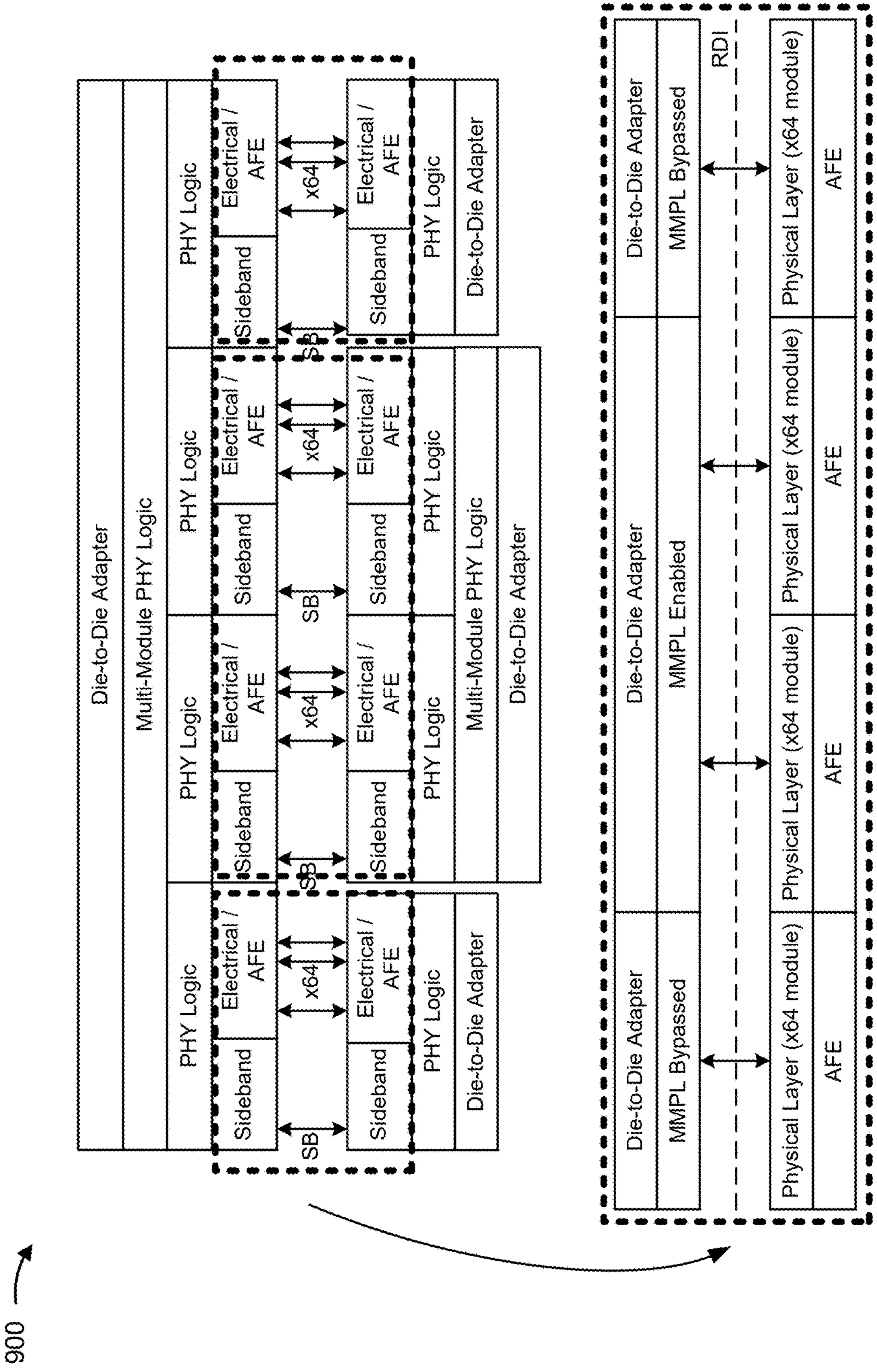
FIGS. 9A-9B are diagrams of examples associated with interfacing modules associated with different configurations, in accordance with the present disclosure.

As shown by reference number 512, the multi-module PHY logic 506 may configure, based at least in part on the initialization parameter exchange, an interfacing between a first set of modules, of the plurality of modules 504, and a second set of modules, of the plurality of modules 504. In a first example, the first set of modules associated with the first configuration may include four modules, and the second set of modules associated with the second configuration may include two multi-module configurations, where each multi-module configuration may include two modules (e.g., as shown in FIG. 7A). In a second example, the first set of modules associated with the first configuration may include four modules, and the second set of modules associated with the second configuration may include four independent single modules (e.g., as shown in FIG. 8A). In a third example, the first set of modules associated with the first configuration may include four modules, and the second set of modules associated with the second configuration may include one multi-module configuration that includes two modules and two independent single modules (e.g., as shown in FIG. 9A).

In some aspects, the multi-module PHY logic 506 may configure the interfacing based at least in part on a first configuration associated with the first set of modules and a second configuration associated with the second set of modules that is different from the first configuration. The multi-module PHY logic 506 may configure the interfacing based at least in part on an update to the second register, which may be associated with a link capability. The second register may include a first set of bits to indicate an active module configuration and a second set of bits to indicate an active D2D stack configuration. The multi-module PHY logic 506, by updating the second register, may configure one or more multi-module PHY logic stacks or one or D2D stacks that support the interfacing. The multi-module PHY logic 506 may update the second register to include information regarding a number of active modules and associated configurations, a number of D2D stacks to be active to drive subsequent links that are formed, and/or one or more modules for which the multi-module PHY logic is to be fully or partially bypassed.

In some aspects, the second set of modules may include only one or more sets of multi-module configurations (e.g., as shown in FIG. 7A). In this example, the multi-module PHY logic 506, to configure the interfacing, may enable a plurality of D2D stacks for the one or more sets of multi-module configurations, where a number associated with the plurality of D2D stacks may correspond to a number associated with the set of multi-module configurations. In some aspects, the second set of modules may include only single independent modules (e.g., as shown in FIG. 8A). In this example, the multi-module PHY logic 506, to configure the interfacing, may configure the single independent modules to bypass the multi-module PHY logic 506 during a data transfer. The multi-module PHY logic 506 may enable a plurality of D2D stacks for the single independent modules, where a number associated with the plurality of D2D stacks may correspond to a number associated with the single independent modules. In some aspects, the second set of modules may include a combination of single independent modules and a multi-module configuration (e.g., as shown in FIG. 9A). In this example, the multi-module PHY logic 506, to configure the interfacing, may enable a plurality of multi-module PHY logic stacks based at least in part on the combination. The multi-module PHY logic 506 may enable a plurality of D2D stacks based at least in part on the combination.

In some aspects, an aggregation or bifurcation feature may be supported in the advanced package multi-module implementation. The advanced package multi-module implementation may support the flexible module configuration, in which each module 504 may be independently configured as per system need, thereby enhancing flexibility to system design. Flexibility may be provided when asymmetric configurations are required to be interfaced, such that different types of multi-module configurations may be able to be interfaced with each other. Different configurations may be selected depending on need, thereby improving design flexibility. The flexible module configuration may support an asymmetric configuration of active modules. The flexible module configuration may enable asymmetric module support to allow for customization, such that an appropriate combination of modules may be selected depending on an application. Asymmetric systems may scale by adding or replacing modules based at least in part on system needs. Further, module reliability may be increased by keeping a standby bus configuration, which may be required in an auto domain to counter ageing effects.

In some aspects, during a link training, the multi-module PHY logic 506, which may be associated with a multi-module configuration, may identify a configuration of modules. Such information may be updated in the second register (e.g., a UCIe link capability register). During the link training, the multi-module PHY logic 506 and/or a D2D adapter may make certain changes with respect to the module 504, which may be a reference multi-module configuration with four modules. When connected modules are single independent modules, the multi-module PHY logic 506 may be bypassed during a data transfer for those modules, and all D2D adapter stacks (e.g., four or two D2D adapter stacks) may be enabled. When connected modules are only a set of multi-module configurations, the multi-module PHY logic 506 may configure a number of D2D adapter stacks that need to be enabled. When connected modules are a combination of single modules and a multi-module configuration, multi-module PHY logic and D2D adapter stacks may be enabled accordingly. Depending on types of modules associated with the reference multi-module configuration with four modules, the multi-module PHY logic 506 may configure the number of D2D adapter stacks and/or the multi-module PHY logic stacks accordingly.

In some aspects, a PHY layer may coordinate a link training and status state machine (LTSSM) for an enabled module. D2D stacks on enabled modules may coordinate with a multi-module PHY logic or PHY layer for an LTSSM state of each established link. A D2D adapter may arbitrate data from protocol layers to different connected module partners, and the D2D adapter may pass the data to an underlying PHY layer. The D2D adaptor may need to support bifurcation and/or aggregation. The multi-module PHY logic 506 in a PHY layer may be responsible for ensuring that bytes are transmitted in a correct order to a correct module. Once links are successfully established, data transfer may be established across all of the links.

In some aspects, after a power is turned on, the plurality of modules 504 may independently start the link training with each other. During the initialization parameter exchange, which may occur between a first module and a second module, of the plurality of modules 504, the first module may identify whether the first module is associated with only a multi-module configuration (aggregation). The first module may exchange, with the second module, a corresponding width of the multi-module configuration (e.g., whether the multi-module configuration is for two modules or four modules). The first module may identify a protocol supported by the multi-module configuration. During the initialization parameter exchange, the first module may identify whether the first module is associated with only a single module configuration (bifurcation). The first module may identify a protocol supported by all single modules. During the initialization parameter exchange, the first module may identify whether the first module is associated with a combination of single/multi-module configuration (bifurcation). The first module may identify a protocol supported by a combination of single/multi-modules. Similarly, during the initialization parameter exchange, the second module may identify whether the second module is associated with only a multi-module configuration (aggregation). The second module may exchange, with the first module, a corresponding width of the multi-module configuration (e.g., whether the multi-module configuration is for two modules or four modules). The second module may identify a protocol supported by the multi-module configuration. During the initialization parameter exchange, the second module may identify whether the second module is associated with only a single module configuration (bifurcation). The second module may identify a protocol supported by all single modules. During the initialization parameter exchange, the second module may identify whether the second module is associated with a combination of single/multi-module configuration (bifurcation). The second module may identify a protocol supported by a combination of single/multi-modules. Thus, during the initialization parameter exchange, both modules involved in the exchange may identify whether only a multi-module configuration, only a single module configuration, or a combination of single/multi-module configuration is applicable.

In some aspects, the multi-module PHY logic 506 may perform a module name mapping update for interfaced modules, which may facilitate a routing of data from multi-modules with underlying modules. In some aspects, the multi-module PHY logic 506 may update the second register with information regarding a number of active modules and an associated configuration, a number of D2D stacks that need to be active to drive subsequent links that are formed (e.g., bits 27:25), and/or for which modules the multi-module PHY logic 506 should be partially or completely bypassed (e.g., bits 24:22). The multi-module PHY logic 506 may configure multi-module PHY logic stacks and/or D2D stacks based at least in part on this register update. Further, a D2D adapter may arbitrate between multiple negotiated protocols.

As indicated above, FIG. 5 is provided as an example. Other examples may differ from what is described with regard to FIG. 5.

FIG. 6 is a diagram of an example 600 associated with a UCIe link capability register, in accordance with the present disclosure.

As shown in FIG. 6, characteristics of a UCIe link may be discovered by software using a UCIe link capability register. The UCIe link capability register may indicate a maximum link width and an advanced package module width. In some aspects, the UCIe link capability register may include a number of bits (e.g., three bits) to indicate an active module configuration. For example, “000” may indicate a default configuration with four multi-modules, “001” may indicate a first module (M0) and a second module (M1) as a single configuration and a third module (M2) and a fourth module (M3) as a single configuration, “010” may indicate M0 and M1 as a single configuration and M2 and M3 as independent modules, “011” may indicate M1 and M2 as a single configuration and M0 and M3 as independent modules, “100” may indicate M2 and M3 as a single configuration and M0 and M1 as independent modules, or “101” may indicate M0, M1, M2, and M3 as independent modules.

In some aspects, the UCIe link capability register may include a number of bits (e.g., three bits) to indicate an active D2D stack configuration. For example, “000” may indicate that, as a default, one D2D stack is active for M0, “001” may indicate that two D2D stacks are active for M0 and M2, “010” may indicate that one D2D stack is active for M0 and M1 and that two D2D stacks are active for M2 and M3, “011” may indicate that one D2D stack is active for M1 and M2 and that two D2D stacks are active for M0 and M3, “100” may indicate that one D2D stack is active for M2 and M3 and that two D2D stacks are active for M0 and M1, or “100” may indicate that four D2D stacks are active for M0, M1, M2, or M3.

As indicated above, FIG. 6 is provided as an example. Other examples may differ from what is described with regard to FIG. 6.

Figure 7B:
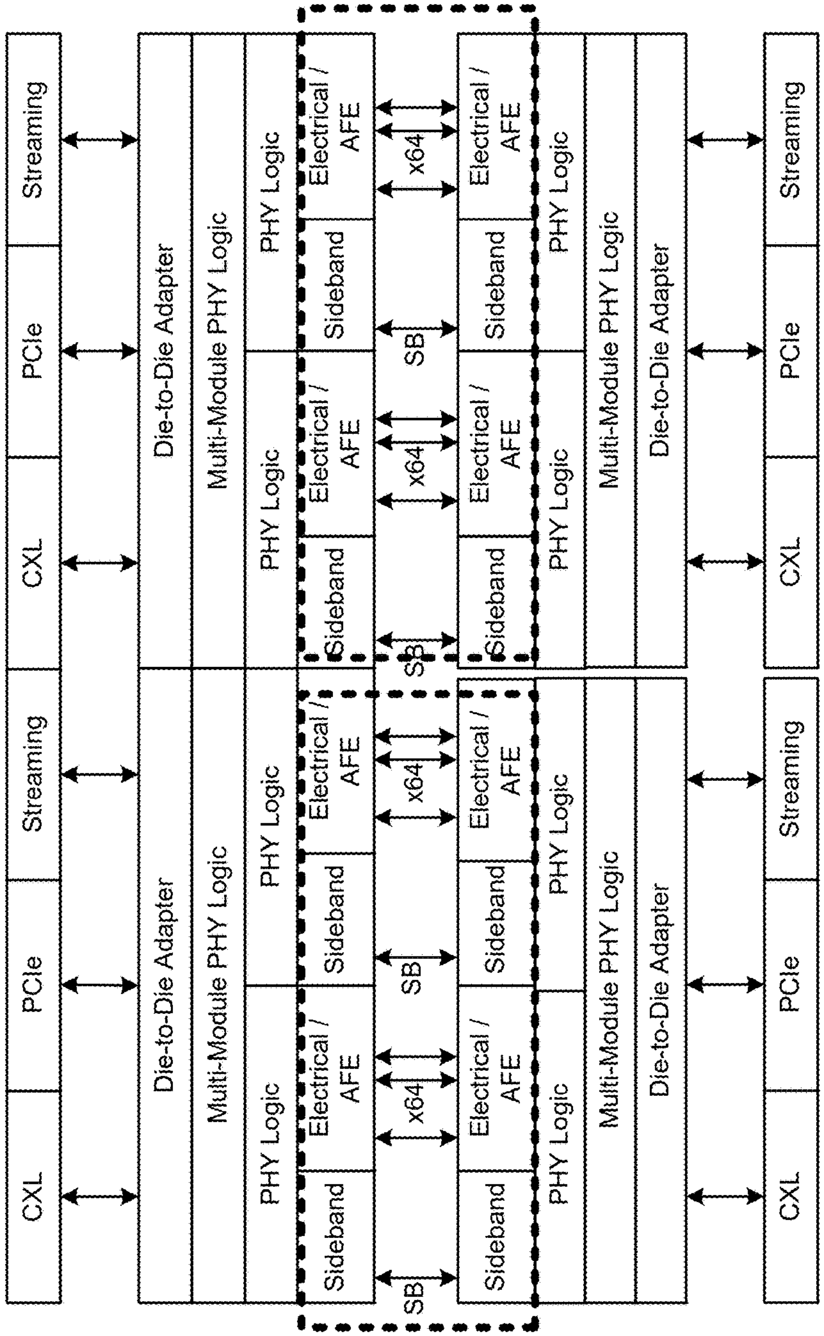

FIGS. 7A-7B are diagrams of examples 700 associated with interfacing modules associated with different configurations, in accordance with the present disclosure.

As shown in FIGS. 7A-7B, a multi-module configuration with four modules may be interfaced with a first multi-module configuration with two modules and a second multi-module configuration with two modules. Two D2D stacks may be enabled and an MMPL may control each stack so that each D2D stack controls two modules in a full width mode, which may enable such an interfacing. In each stack, an MMPL may be enabled, where the MMPL may be associated with a raw D2D interface (RDI). The two D2D stacks may each support various functionalities and/or protocols, such as Compute eXpress Link (CXL), Peripheral Component Interconnect Express (PCIe), and/or streaming. In some aspects, the MMPL may update a UCIe link capability register with information regarding a number of active modules and a corresponding configuration, a number of D2D stacks that need to be active to drive subsequent links that are formed (e.g., bits 27:25 are set as 1), and for which modules the MMPL should be partially or completely bypassed (e.g., bits 24:22 are set as 1). The MMPL may configure MMPL and D2D stacks based at least in part on this register update. Further, the UCIe link capability register may indicate a maximum link width of x128 (128 lanes) and an advanced package module width.

As indicated above, FIGS. 7A-7B are provided as examples. Other examples may differ from what is described with regard to FIGS. 7A-7B.

Figure 8B:
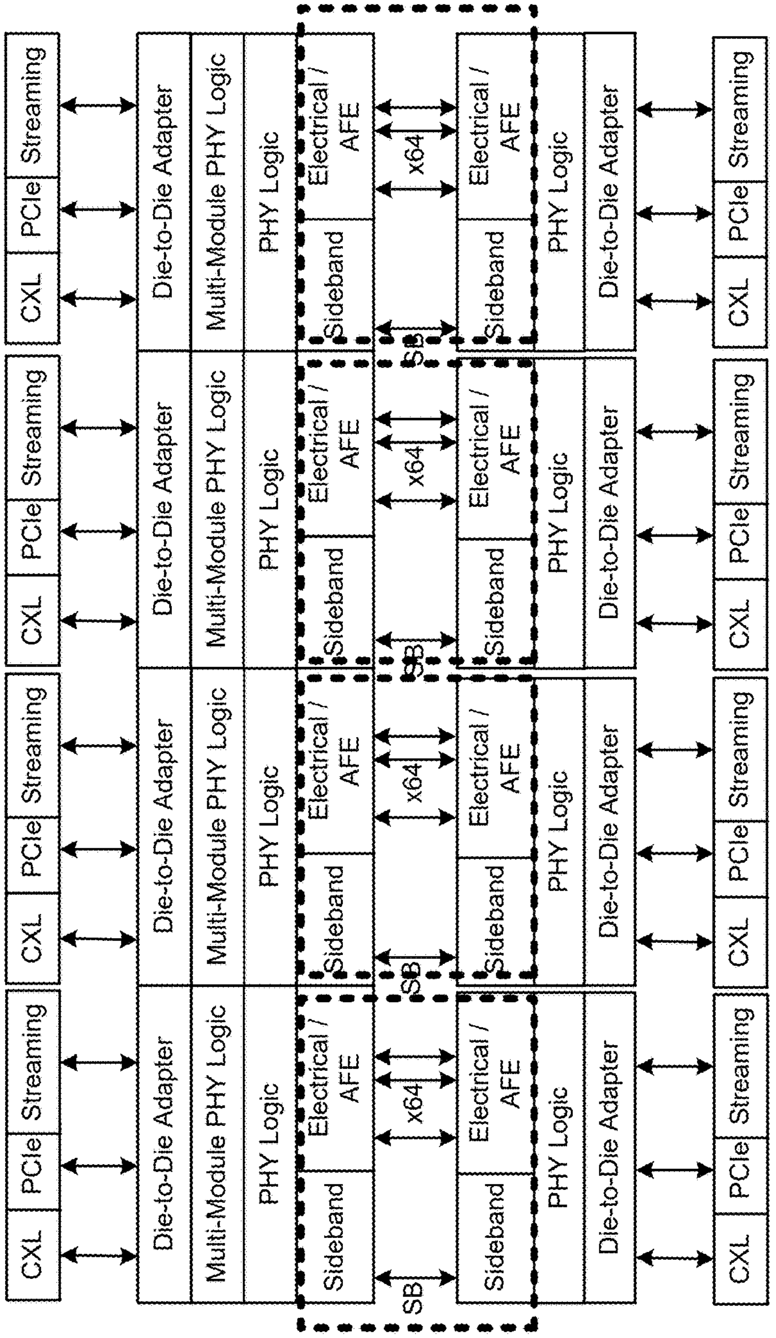

FIGS. 8A-8B are diagrams of examples 800 associated with interfacing modules associated with different configurations, in accordance with the present disclosure.

As shown in FIGS. 8A-8B, a multi-module configuration with four modules may be interfaced with a first single-module configuration, a second single-module configuration, a third single-module configuration, and a fourth single-module configuration. The multi-module configuration with four modules may be interfaced with four independent single modules. Four D2D stacks may be enabled and an MMPL may be bypassed, where each stack may use one module and operate in a full width mode for each stack, which may enable such an interfacing. In each stack, an MMPL may be bypassed. The four D2D stacks may each support various functionalities and/or protocols, such as CXL, PCIe, and/or streaming. In some aspects, the MMPL may update a UCIe link capability register with information regarding a number of active modules and a corresponding configuration, a number of D2D stacks that need to be active to drive subsequent links that are formed (e.g., bits 27:25 are set as 5), and for which modules the MMPL should be partially or completely bypassed (e.g., bits 24:22 are set as 5). The MMPL may configure MMPL and D2D stacks based at least in part on this register update. Further, the UCIe link capability register may indicate a maximum link width of x64 (64 lanes) and an advanced package module width.

As indicated above, FIGS. 8A-8B are provided as examples. Other examples may differ from what is described with regard to FIGS. 8A-8B.

Figure 9B:
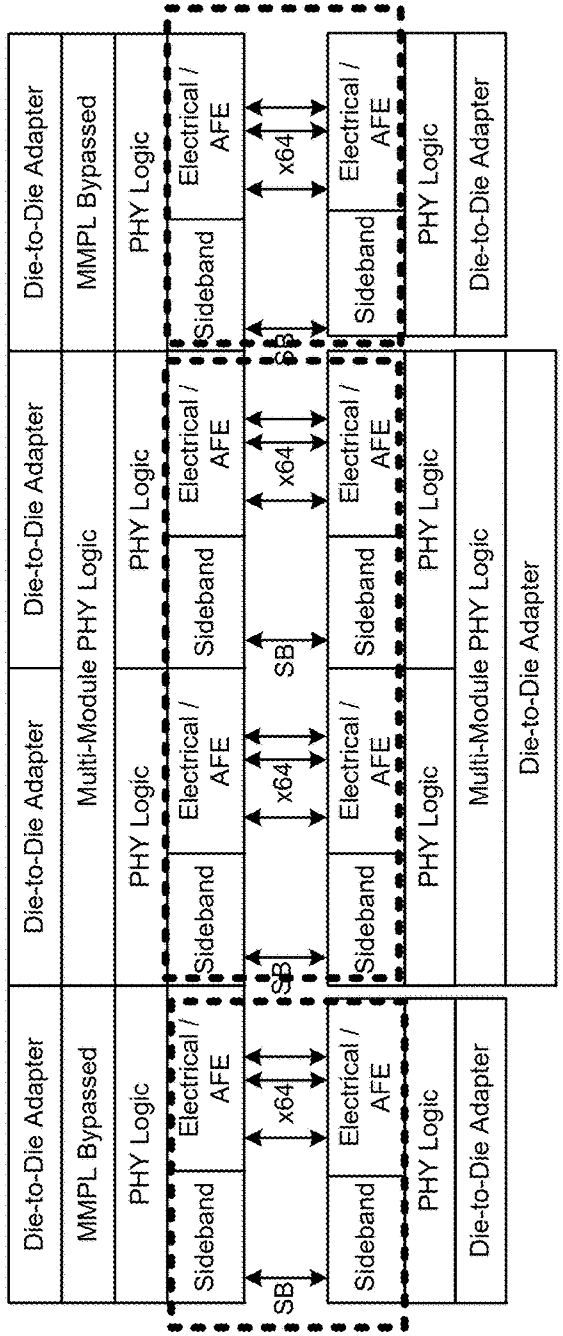

FIGS. 9A-9B are diagrams of examples 900 associated with interfacing modules associated with different configurations, in accordance with the present disclosure.

As shown in FIGS. 9A-9B, a multi-module configuration with four modules may be interfaced with a multi-module configuration with two modules, a first single-module configuration, and a second single-module configuration. The multi-module configuration with four modules may be interfaced with one multi-module configuration with two modules and two independent single modules. Three D2D stacks may be enabled and an MMPL may control one D2D stack bundling two modules (M1 and M2) as a single entity in a full width mode (MMPL is enabled), where an MMPL may be bypassed for the other two modules (M0 and M3), which may enable such an interfacing. The three D2D stacks may each support various functionalities and/or protocols, such as CXL, PCIe, and/or streaming. In some aspects, the MMPL may update a UCIe link capability register with information regarding a number of active modules and a corresponding configuration, a number of D2D stacks that need to be active to drive subsequent links that are formed (e.g., bits 27:25 are set as 3), and for which modules the MMPL should be partially or completely bypassed (e.g., bits 24:22 are set as 3). The MMPL may configure MMPL and D2D stacks based at least in part on this register update. Further, the UCIe link capability register may indicate a maximum link width of x128 (128 lanes) and an advanced package module width.

As indicated above, FIGS. 9A-9B are provided as examples. Other examples may differ from what is described with regard to FIGS. 9A-9B.

Figure 10:
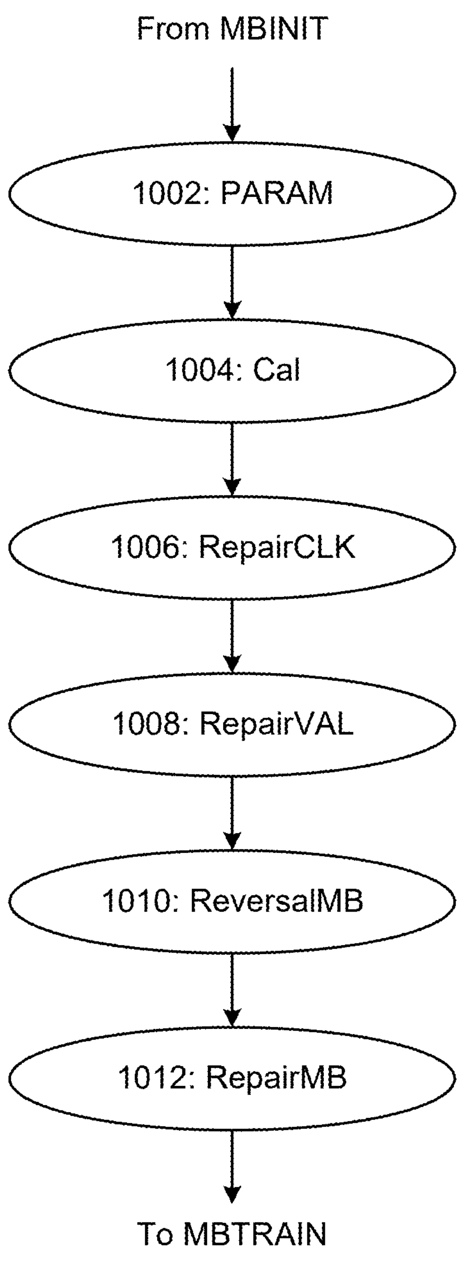
FIG. 10 is a diagram of an example associated with a UCIe link training state machine, in accordance with the present disclosure.

FIG. 10 is a diagram of an example 1000 associated with interfacing modules associated with different configurations, in accordance with the present disclosure.

As shown by reference number 1002, during a mainband initialization (MBINIT) and repair flow that is based at least in part on a UCIe link training state machine, a parameter exchange (PARAM) may occur after a mainband initialization. The parameter exchange may indicate whether a flexible module configuration is supported that enables modules associated different configurations to be interfaced with each other. During the parameter exchange, a module configuration may be communicated with module partners. As shown by reference number 1004, a calibration (Cal) may be performed. As shown by reference number 1006, a clock repair (RepairCLK) may be performed. As shown by reference number 1008, a valid lane repair (RepairVAL) may be performed. As shown by reference number 1010, a data lane reversal (ReversalMB) may be detected. As shown by reference number 1012, a mainband lane repair (RepairMB) may be performed, which may be followed by a mainband training (MBTRAIN).

As indicated above, FIG. 10 is provided as an example. Other examples may differ from what is described with regard to FIG. 10.

Figure 11:
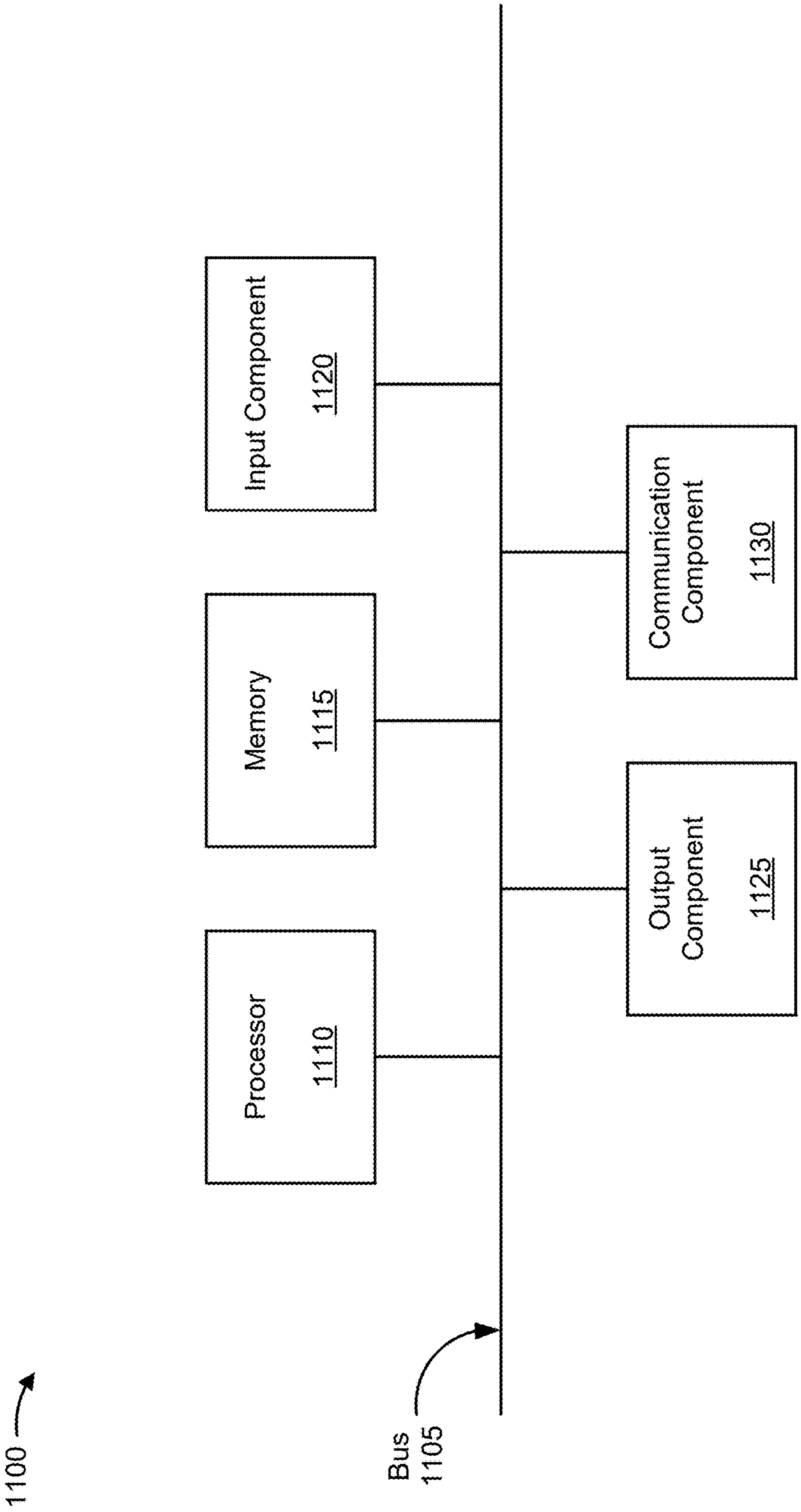
FIG. 11 is a diagram illustrating example components of a device, in accordance with the present disclosure.

FIG. 11 is a diagram illustrating example components of a device 1100, in accordance with the present disclosure. The device 1100 may be associated with a UCIe link training state machine. As shown in FIG. 11, the device 1100 may include a bus 1105, a processor 1110, a memory 1115, an input component 1120, an output component 1125, and/or a communication component 1130.

The bus 1105 may include one or more components that enable wired and/or wireless communication among the components of the device 1100. The bus 1105 may couple together two or more components of FIG. 11, such as via operative coupling, communicative coupling, electronic coupling, and/or electric coupling. For example, the bus 1105 may include an electrical connection (e.g., a wire, a trace, and/or a lead) and/or a wireless bus. The processor 1110 may include a central processing unit, a graphics processing unit, a microprocessor, a controller, a microcontroller, a digital signal processor, a field-programmable gate array, an application-specific integrated circuit, and/or another type of processing component. The processor 1110 may be implemented in hardware, firmware, or a combination of hardware and software. In some aspects, the processor 1110 may include one or more processors capable of being programmed to perform one or more operations or processes described elsewhere herein.

The memory 1115 may include volatile and/or nonvolatile memory. For example, the memory 1115 may include random access memory (RAM), read only memory (ROM), a hard disk drive, and/or another type of memory (e.g., a flash memory, a magnetic memory, and/or an optical memory). The memory 1115 may include internal memory (e.g., RAM, ROM, or a hard disk drive) and/or removable memory (e.g., removable via a universal serial bus connection). The memory 1115 may be a non-transitory computer-readable medium. The memory 1115 may store information, one or more instructions, and/or software (e.g., one or more software applications) related to the operation of the device 1100. In some aspects, the memory 1115 may include one or more memories that are coupled (e.g., communicatively coupled) to one or more processors (e.g., processor 1110), such as via the bus 1105. Communicative coupling between a processor 1110 and a memory 1115 may enable the processor 1110 to read and/or process information stored in the memory 1115 and/or to store information in the memory 1115.

The input component 1120 may enable the device 1100 to receive input, such as user input and/or sensed input. For example, the input component 1120 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1125 may enable the device 1100 to provide output, such as via a display, a speaker, and/or a light-emitting diode. The communication component 1130 may enable the device 1100 to communicate with other devices via a wired connection and/or a wireless connection. For example, the communication component 1130 may include a receiver, a transmitter, a transceiver, a modem, a network interface card, and/or an antenna.

The device 1100 may perform one or more operations or processes described herein. For example, a non-transitory computer-readable medium (e.g., memory 1115) may store a set of instructions (e.g., one or more instructions or code) for execution by the processor 1110. The processor 1110 may execute the set of instructions to perform one or more operations or processes described herein. In some aspects, execution of the set of instructions, by one or more processors 1110, causes the one or more processors 1110 and/or the device 1100 to perform one or more operations or processes described herein. In some aspects, hardwired circuitry may be used instead of or in combination with the instructions to perform one or more operations or processes described herein. Additionally, or alternatively, the processor 1110 may be configured to perform one or more operations or processes described herein. Thus, aspects described herein are not limited to any specific combination of hardware circuitry and software.

The number and arrangement of components shown in FIG. 11 are provided as an example. The device 1100 may include additional components, fewer components, different components, or differently arranged components than those shown in FIG. 11. Additionally, or alternatively, a set of components (e.g., one or more components) of the device 1100 may perform one or more functions described as being performed by another set of components of the device 1100.

Figure 12:
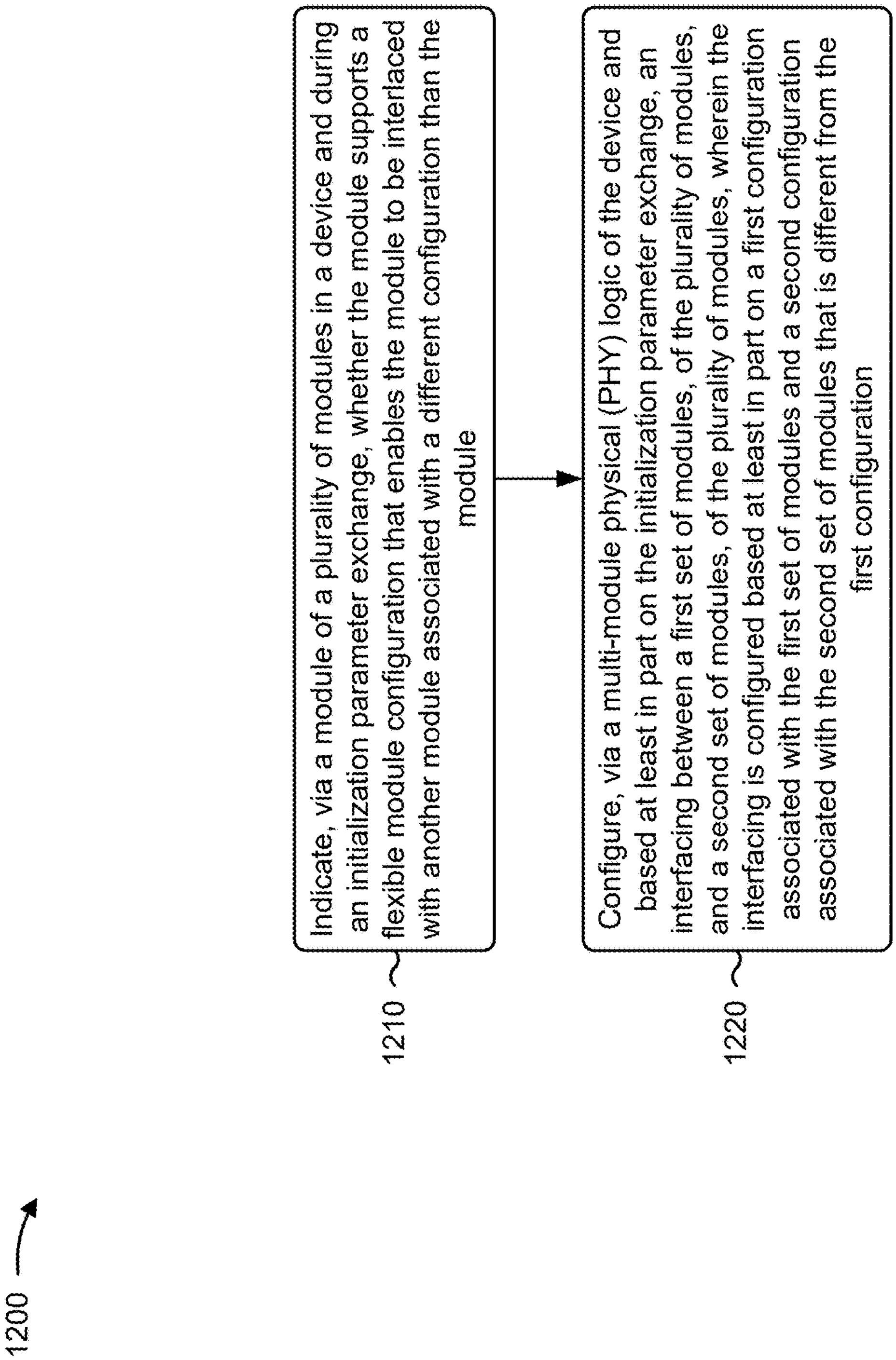
FIG. 12 is a flowchart of an example process associated with interfacing modules associated with different configurations, in accordance with the present disclosure.

FIG. 12 is a flowchart of an example process 1200 associated with interfacing modules associated with different configurations, in accordance with the present disclosure. In some implementations, one or more process blocks of FIG. 12 are performed by a device (e.g., device 502). Additionally, or alternatively, one or more process blocks of FIG. 12 may be performed by one or more components of device 1100, such as processor 1110, memory 1115, input component 1120, output component 1125, and/or communication component 1130.

As shown in FIG. 12, process 1200 may include indicating, via a module of a plurality of modules in the device and during an initialization parameter exchange, whether the module supports a flexible module configuration that enables the module to be interfaced with another module associated with a different configuration than the module (block 1210). For example, the device may indicate, via a module of a plurality of modules in the device and during an initialization parameter exchange, whether the module supports a flexible module configuration that enables the module to be interfaced with another module associated with a different configuration than the module, as described above.

As further shown in FIG. 12, process 1200 may include configuring, via a multi-module PHY logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration (block 1220). For example, the device may configure, via a multi-module PHY logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration, as described above.

Process 1200 may include additional implementations, such as any single implementation or any combination of implementations described below and/or in connection with one or more other processes described elsewhere herein.

In a first implementation, the flexible module configuration is supported by the module, and process 1200 includes indicating, via the module and during the initialization parameter exchange, whether the module is associated with a single module configuration, or whether the module is associated with a multi-module configuration.

In a second implementation, alone or in combination with the first implementation, process 1200 includes configuring, via the multi-module PHY logic, a register that indicates a first bit and a second bit, wherein the first bit is set to indicate whether the flexible module configuration is supported, and wherein the second bit is set to indicate whether the flexible module configuration is enabled while the flexible module configuration is supported.

In a third implementation, alone or in combination with one or more of the first and second implementations, the multi-module PHY logic is configured to configure the interfacing based at least in part on an update to a register associated with a link capability; the update to the register configures one or more multi-module PHY logic stacks or one or more D2D stacks that support the interfacing, wherein the register includes a first set of bits to indicate an active module configuration and a second set of bits to indicate an active D2D stack configuration; and the register is updated to include information regarding: a number of active modules and associated configurations, a number of D2D stacks to be active to drive subsequent links that are formed, and one or more modules for which the multi-module PHY logic is to be fully or partially bypassed In a fourth implementation, alone or in combination with one or more of the first through third implementations, the second set of modules includes only single independent modules, and process 1200 includes configuring, via the multi-module PHY logic, the single independent modules to bypass the multi-module PHY logic during a data transfer; and enabling, via the multi-module PHY logic, a plurality of D2D stacks for the single independent modules, wherein a number associated with the plurality of D2D stacks corresponds to a number associated with the single independent modules.

In a fifth implementation, alone or in combination with one or more of the first through fourth implementations, the second set of modules includes only one or more sets of multi-module configurations, and process 1200 includes enabling, via the multi-module PHY logic, a plurality of D2D stacks for the one or more sets of multi-module configurations, wherein a number associated with the plurality of D2D stacks corresponds to a number associated with the set of multi-module configurations.

In a sixth implementation, alone or in combination with one or more of the first through fifth implementations, the second set of modules includes a combination of single independent modules and a multi-module configuration, and process 1200 includes enabling, via the multi-module PHY logic, a plurality of multi-module PHY logic stacks based at least in part on the combination; and enabling, via the multi-module PHY logic, a plurality of D2D stacks based at least in part on the combination.

In a seventh implementation, alone or in combination with one or more of the first through sixth implementations, the first set of modules associated with the first configuration includes four modules and the second set of modules associated with the second configuration includes two multi-module configurations, wherein each multi-module configuration includes two modules; the first set of modules associated with the first configuration includes four modules and the second set of modules associated with the second configuration includes four independent single modules; or the first set of modules associated with the first configuration includes four modules and the second set of modules associated with the second configuration includes one multi-module configuration that includes two modules and two independent single modules.

In an eighth implementation, alone or in combination with one or more of the first through seventh implementations, the plurality of modules are in accordance with a UCIe specification.

Although FIG. 12 shows example blocks of process 1200, in some implementations, process 1200 includes additional blocks, fewer blocks, different blocks, or differently arranged blocks than those depicted in FIG. 12. Additionally, or alternatively, two or more of the blocks of process 1200 may be performed in parallel.

The following provides an overview of some Aspects of the present disclosure:

Aspect 1: A device, comprising: a plurality of modules, wherein a module of the plurality of modules is configured to: indicate, during an initialization parameter exchange, whether the module supports a flexible module configuration that enables the module to be interfaced with another module associated with a different configuration than the module; and multi-module physical (PHY) logic configured to: configure, based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

Aspect 2: The device of Aspect 1, wherein the flexible module configuration is supported by the module, and wherein the module is further configured to: indicate, during the initialization parameter exchange, whether the module is associated with a single module configuration, or whether the module is associated with a multi-module configuration.

Aspect 3: The device of any of Aspects 1-2, wherein the multi-module PHY logic is further configured to: configure a register that indicates a first bit and a second bit, wherein the first bit is set to indicate whether the flexible module configuration is supported, and wherein the second bit is set to indicate whether the flexible module configuration is enabled while the flexible module configuration is supported.

Aspect 4: The device of any of Aspects 1-3, wherein: the multi-module PHY logic is configured to configure the interfacing based at least in part on an update to a register associated with a link capability; the update to the register configures one or more multi-module PHY logic stacks or one or more die-to-die (D2D) stacks that support the interfacing; and the register is updated to include information regarding: a number of active modules and associated configurations, a number of D2D stacks to be active to drive subsequent links that are formed, and one or more modules for which the multi-module PHY logic is to be fully or partially bypassed.

Aspect 5: The device of Aspect 4, wherein the register includes a first set of bits to indicate an active module configuration and a second set of bits to indicate an active die-to-die (D2D) stack configuration.

Aspect 6: The device of any of Aspects 1-5, wherein the second set of modules includes only single independent modules, and wherein the multi-module PHY logic, to configure the interfacing, is configured to: configure the single independent modules to bypass the multi-module PHY logic during a data transfer; and enable a plurality of die-to-die (D2D) stacks for the single independent modules, wherein a number associated with the plurality of D2D stacks corresponds to a number associated with the single independent modules.

Aspect 7: The device of any of Aspects 1-6, wherein the second set of modules includes only one or more sets of multi-module configurations, and wherein the multi-module PHY logic, to configure the interfacing, is configured to: enable a plurality of die-to-die (D2D) stacks for the one or more sets of multi-module configurations, wherein a number associated with the plurality of D2D stacks corresponds to a number associated with the set of multi-module configurations.

Aspect 8: The device of any of Aspects 1-7, wherein the second set of modules includes a combination of single independent modules and a multi-module configuration, and wherein the multi-module PHY logic, to configure the interfacing, is configured to: enable a plurality of multi-module PHY logic stacks based at least in part on the combination; and enable a plurality of die-to-die (D2D) stacks based at least in part on the combination.

Aspect 9: The device of any of Aspects 1-8, wherein: the first set of modules associated with the first configuration includes four modules and the second set of modules associated with the second configuration includes two multi-module configurations, wherein each multi-module configuration includes two modules; the first set of modules associated with the first configuration includes four modules and the second set of modules associated with the second configuration includes four independent single modules; or the first set of modules associated with the first configuration includes four modules and the second set of modules associated with the second configuration includes one multi-module configuration that includes two modules and two independent single modules.

Aspect 10: The device of any of Aspects 1-9, wherein the plurality of modules are in accordance with a universal chiplet interconnect express (UCIe) specification.

Aspect 11: A method, comprising: indicating, via a module of a plurality of modules in a device and during an initialization parameter exchange, whether the module supports a flexible module configuration that enables the module to be interfaced with another module associated with a different configuration than the module; and configuring, via a multi-module physical (PHY) logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

Aspect 12: The method of Aspect 11, wherein the flexible module configuration is supported by the module, and further comprising: indicating, via the module and during the initialization parameter exchange, whether the module is associated with a single module configuration, or whether the module is associated with a multi-module configuration.

Aspect 13: The method of any of Aspects 11-12, further comprising: configuring, via the multi-module PHY logic, a register that indicates a first bit and a second bit, wherein the first bit is set to indicate whether the flexible module configuration is supported, and wherein the second bit is set to indicate whether the flexible module configuration is enabled while the flexible module configuration is supported.

Aspect 14: The method of any of Aspects 11-13, wherein: the multi-module PHY logic is configured to configure the interfacing based at least in part on an update to a register associated with a link capability; the update to the register configures one or more multi-module PHY logic stacks or one or more die-to-die (D2D) stacks that support the interfacing, wherein the register includes a first set of bits to indicate an active module configuration and a second set of bits to indicate an active D2D stack configuration; and the register is updated to include information regarding: a number of active modules and associated configurations, a number of D2D stacks to be active to drive subsequent links that are formed, and one or more modules for which the multi-module PHY logic is to be fully or partially bypassed.

Aspect 15: The method of any of Aspects 11-14, wherein the second set of modules includes only single independent modules, and wherein configuring the interfacing further comprises: configuring, via the multi-module PHY logic, the single independent modules to bypass the multi-module PHY logic during a data transfer; and enabling, via the multi-module PHY logic, a plurality of die-to-die (D2D) stacks for the single independent modules, wherein a number associated with the plurality of D2D stacks corresponds to a number associated with the single independent modules.

Aspect 16: The method of any of Aspects 11-15, wherein the second set of modules includes only one or more sets of multi-module configurations, and wherein configuring the interfacing further comprises: enabling, via the multi-module PHY logic, a plurality of die-to-die (D2D) stacks for the one or more sets of multi-module configurations, wherein a number associated with the plurality of D2D stacks corresponds to a number associated with the set of multi-module configurations.

Aspect 17: The method of any of Aspects 11-16, wherein the second set of modules includes a combination of single independent modules and a multi-module configuration, and wherein configuring the interfacing further comprises: enabling, via the multi-module PHY logic, a plurality of multi-module PHY logic stacks based at least in part on the combination; and enabling, via the multi-module PHY logic, a plurality of die-to-die (D2D) stacks based at least in part on the combination.

Aspect 18: The method of any of Aspects 11-17, wherein: the first set of modules associated with the first configuration includes four modules and the second set of modules associated with the second configuration includes two multi-module configurations, wherein each multi-module configuration includes two modules; the first set of modules associated with the first configuration includes four modules and the second set of modules associated with the second configuration includes four independent single modules; or the first set of modules associated with the first configuration includes four modules and the second set of modules associated with the second configuration includes one multi-module configuration that includes two modules and two independent single modules.

Aspect 19: The method of any of Aspects 11-18, wherein the plurality of modules are in accordance with a universal chiplet interconnect express (UCIe) specification.

Aspect 20: A non-transitory computer-readable medium storing a set of instructions, the set of instructions comprising: one or more instructions that, when executed by one or more processors of a device, cause the device to: indicate, via a module of a plurality of modules in the device and during an initialization parameter exchange, whether the module supports a flexible module configuration that enables the module to be interfaced with another module associated with a different configuration than the module; and configure, via a multi-module PHY logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:

a plurality of modules, wherein the plurality of modules are in accordance with a universal chiplet interconnect express (UCIe) specification, and wherein a module of the plurality of modules is configured to:

indicate, during an initialization parameter exchange, whether the module supports a flexible module configuration that enables the module to be interfaced with another module associated with a different configuration than the module; and multi-module physical (PHY) logic configured to:

configure, based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

2. The device of claim 1, wherein the flexible module configuration is supported, and wherein the module is further configured to:

indicate, during the initialization parameter exchange, whether the module is associated with a single module configuration, or whether the module is associated with a multi-module configuration.

3. The device of claim 1, wherein the multi-module PHY logic is configured to:

configure a register that indicates a first bit and a second bit, wherein the first bit is set to indicate whether the flexible module configuration is supported, and wherein the second bit is set to indicate whether the flexible module configuration is enabled while the flexible module configuration is supported.

4. The device of claim 1, wherein:

the multi-module PHY logic is configured to configure the interfacing based at least in part on an update to a register associated with a link capability;

the update to the register configures one or more multi-module PHY logic stacks or one or more die-to-die (D2D) stacks that support the interfacing; and the register is updated to include information regarding: a number of active modules and associated configurations, a number of D2D stacks to be active to drive subsequent links that are formed, and one or more modules for which the multi-module PHY logic is to be fully or partially bypassed.

5. The device of claim 4, wherein the register includes a first set of bits to indicate an active module configuration and a second set of bits to indicate an active die-to-die (D2D) stack configuration.

6. The device of claim 1, wherein the second set of modules includes only single independent modules, and wherein the multi-module PHY logic, to configure the interfacing, is configured to:

configure the single independent modules to bypass the multi-module PHY logic during a data transfer; and enable a plurality of die-to-die (D2D) stacks for the single independent modules, wherein a number associated with the plurality of D2D stacks corresponds to a number associated with the single independent modules.

7. The device of claim 1, wherein the second set of modules includes only one or more sets of multi-module configurations, and wherein the multi-module PHY logic, to configure the interfacing, is configured to:

enable a plurality of die-to-die (D2D) stacks for the one or more sets of multi-module configurations, wherein a number associated with the plurality of D2D stacks corresponds to a number associated with the set of multi-module configurations.

8. The device of claim 1, wherein the second set of modules includes a combination of single independent modules and a multi-module configuration, and wherein the multi-module PHY logic, to configure the interfacing, is configured to:

enable a plurality of multi-module PHY logic stacks based at least in part on the combination; and enable a plurality of die-to-die (D2D) stacks based at least in part on the combination.

9. The device of claim 1, wherein:

the first set of modules associated with the first configuration includes four modules and the second set of modules associated with the second configuration includes two multi-module configurations, wherein each multi-module configuration includes two modules;

the first set of modules associated with the first configuration includes four modules and the second set of modules associated with the second configuration includes four independent single modules; or the first set of modules associated with the first configuration includes four modules and the second set of modules associated with the second configuration includes one multi-module configuration that includes two modules and two independent single modules.

10. A method, comprising:

indicating, via a module of a plurality of modules in a device and during an initialization parameter exchange, whether the module supports a flexible module configuration that enables the module to be interfaced with another module associated with a different configuration than the module, wherein the plurality of modules are in accordance with a universal chiplet interconnect express (UCIe) specification; and configuring, via a multi-module physical (PHY) logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

11. The method of claim 10, wherein the flexible module configuration is supported by the module, and further comprising:

indicating, via the module and during the initialization parameter exchange, whether the module is associated with a single module configuration, or whether the module is associated with a multi-module configuration.

12. The method of claim 10, further comprising:

configuring, via the multi-module PHY logic, a register that indicates a first bit and a second bit, wherein the first bit is set to indicate whether the flexible module configuration is supported, and wherein the second bit is set to indicate whether the flexible module configuration is enabled while the flexible module configuration is supported.

13. The method of claim 10, wherein:

the multi-module PHY logic is configured to configure the interfacing based at least in part on an update to a register associated with a link capability;

the update to the register configures one or more multi-module PHY logic stacks or one or more die-to-die (D2D) stacks that support the interfacing, wherein the register includes a first set of bits to indicate an active module configuration and a second set of bits to indicate an active D2D stack configuration; and the register is updated to include information regarding: a number of active modules and associated configurations, a number of D2D stacks to be active to drive subsequent links that are formed, and one or more modules for which the multi-module PHY logic is to be fully or partially bypassed.

14. The method of claim 10, wherein the second set of modules includes only single independent modules, and wherein configuring the interfacing further comprises:

configuring, via the multi-module PHY logic, the single independent modules to bypass the multi-module PHY logic during a data transfer; and enabling, via the multi-module PHY logic, a plurality of die-to-die (D2D) stacks for the single independent modules, wherein a number associated with the plurality of D2D stacks corresponds to a number associated with the single independent modules.

15. The method of claim 10, wherein the second set of modules includes only one or more sets of multi-module configurations, and wherein configuring the interfacing further comprises:

enabling, via the multi-module PHY logic, a plurality of die-to-die (D2D) stacks for the one or more sets of multi-module configurations, wherein a number associated with the plurality of D2D stacks corresponds to a number associated with the set of multi-module configurations.

16. The method of claim 10, wherein the second set of modules includes a combination of single independent modules and a multi-module configuration, and wherein configuring the interfacing further comprises:

enabling, via the multi-module PHY logic, a plurality of multi-module PHY logic stacks based at least in part on the combination; and enabling, via the multi-module PHY logic, a plurality of die-to-die (D2D) stacks based at least in part on the combination.

17. The method of claim 10, wherein:

the first set of modules associated with the first configuration includes four modules and the second set of modules associated with the second configuration includes two multi-module configurations, wherein each multi-module configuration includes two modules;

the first set of modules associated with the first configuration includes four modules and the second set of modules associated with the second configuration includes four independent single modules; or the first set of modules associated with the first configuration includes four modules and the second set of modules associated with the second configuration includes one multi-module configuration that includes two modules and two independent single modules.

18. A non-transitory computer-readable medium storing a set of instructions, the set of instructions comprising:

one or more instructions that, when executed by one or more processors of a device, cause the device to:

indicate, via a module of a plurality of modules in the device and during an initialization parameter exchange, whether the module supports a flexible module configuration that enables the module to be interfaced with another module associated with a different configuration than the module, wherein the plurality of modules are in accordance with a universal chiplet interconnect express (UCIe) specification; and configure, via a multi-module physical (PHY) logic of the device and based at least in part on the initialization parameter exchange, an interfacing between a first set of modules, of the plurality of modules, and a second set of modules, of the plurality of modules, wherein the interfacing is configured based at least in part on a first configuration associated with the first set of modules and a second configuration associated with the second set of modules that is different from the first configuration.

* * * * *